US009208496B2

(12) United States Patent
Altberg et al.

(10) Patent No.: US 9,208,496 B2
(45) Date of Patent: *Dec. 8, 2015

(54) SYSTEMS AND METHODS TO PROVIDE A COMMUNICATION REFERENCE IN A REPRESENTATION OF A GEOGRAPHICAL REGION

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Ben Harris Lyon, San Francisco, CA (US); Paul G. Manca, Oakland, CA (US); Dmitry Dave Yevdayev, San Francisco, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 1842 days.

This patent is subject to a terminal disclaimer.

(21) Appl. No.: 11/558,859

(22) Filed: Nov. 10, 2006

(65) Prior Publication Data

US 2007/0083408 A1    Apr. 12, 2007

(51) Int. Cl.
*G06Q 30/00* (2012.01)
*G06Q 30/02* (2012.01)
*H04M 15/00* (2006.01)

(52) U.S. Cl.
CPC ............ *G06Q 30/02* (2013.01); *G06Q 30/0243* (2013.01); *G06Q 30/0251* (2013.01); *G06Q 30/0256* (2013.01); *G06Q 30/0259* (2013.01); *G06Q 30/0261* (2013.01); *G06Q 30/0273* (2013.01); *H04M 15/00* (2013.01)

(58) Field of Classification Search
CPC .............. G06Q 30/02; G06Q 30/0273; G06Q 30/0243; G06Q 30/0251; G06Q 30/0256; G06Q 30/0259; G06Q 30/0261; H04M 15/00
USPC .......... 705/14.69, 14.43, 14.49, 14.54, 14.57, 705/14.58; 379/114.01, 114.13, 114.23
See application file for complete search history.

(56) References Cited

U.S. PATENT DOCUMENTS

| 4,850,007 A | 7/1989 | Marino et al. |
| 4,963,995 A | 10/1990 | Lang |
| 5,057,932 A | 10/1991 | Lang |

(Continued)

FOREIGN PATENT DOCUMENTS

| KR | 20010099043 | 11/2001 |
| KR | 20020019745 | 3/2002 |

(Continued)

OTHER PUBLICATIONS

"AtOnce Talks Up E-mail Marketing Campaigns with ITXC Push to Talk Service," Business Wire, Feb. 26, 2001.

(Continued)

*Primary Examiner* — Raquel Alvarez
(74) *Attorney, Agent, or Firm* — Alston & Bird LLP

(57) ABSTRACT

Systems and methods to provide a reference for communication with a business is disclosed here. One embodiment includes providing a reference for real-time communication with a business to be placed in a representation of a geographical region at a location within the representation corresponding to a location of the business, tracking usage of the reference, and billing the business for providing the reference for real-time communication based on quantitative usage of the reference.

14 Claims, 33 Drawing Sheets

(56) References Cited

U.S. PATENT DOCUMENTS

| | | | |
|---|---|---|---|
| 5,164,839 A | 11/1992 | Lang | |
| 5,262,875 A | 11/1993 | Mincer et al. | |
| 5,440,334 A | 8/1995 | Walters et al. | |
| 5,524,146 A | 6/1996 | Morrisey et al. | |
| 5,696,965 A | 12/1997 | Dedrick | |
| 5,710,970 A | 1/1998 | Walters et al. | |
| 5,751,956 A | 5/1998 | Kirsch | |
| 5,774,534 A | 6/1998 | Mayer | |
| 5,793,851 A | 8/1998 | Albertson | |
| 5,850,433 A | 12/1998 | Rondeau | |
| RE36,111 E | 2/1999 | Neville | |
| 5,870,546 A | 2/1999 | Kirsch | |
| 5,937,390 A | 8/1999 | Hyodo | |
| 5,963,202 A | 10/1999 | Polish | |
| 5,963,861 A | 10/1999 | Hanson | |
| 5,978,567 A | 11/1999 | Rebane et al. | |
| 5,995,705 A | 11/1999 | Lang | |
| 5,999,965 A | 12/1999 | Kelly | |
| 6,014,629 A * | 1/2000 | DeBruin-Ashton | 705/2 |
| 6,108,704 A | 8/2000 | Hutton et al. | |
| 6,189,030 B1 | 2/2001 | Kirsch et al. | |
| 6,208,713 B1 | 3/2001 | Rahrer et al. | |
| 6,216,111 B1 | 4/2001 | Walker et al. | |
| 6,243,684 B1 | 6/2001 | Stuart et al. | |
| 6,269,361 B1 | 7/2001 | Davis et al. | |
| 6,275,490 B1 | 8/2001 | Mattaway et al. | |
| 6,327,572 B1 | 12/2001 | Morton et al. | |
| 6,466,966 B1 | 10/2002 | Kirsch et al. | |
| 6,470,079 B1 | 10/2002 | Benson | |
| 6,470,181 B1 | 10/2002 | Maxwell | |
| 6,510,417 B1 | 1/2003 | Quilici et al. | |
| 6,516,057 B2 | 2/2003 | Meek et al. | |
| 6,529,878 B2 | 3/2003 | De Rafael et al. | |
| 6,560,576 B1 | 5/2003 | Cohen et al. | |
| 6,691,114 B1 * | 2/2004 | Nakamura | 1/1 |
| 6,731,736 B2 | 5/2004 | Meek et al. | |
| 6,760,537 B2 | 7/2004 | Mankovitz | |
| 6,769,020 B2 | 7/2004 | Miyazaki et al. | |
| 6,850,965 B2 | 2/2005 | Allen | |
| 6,859,833 B2 | 2/2005 | Kirsch et al. | |
| 6,968,174 B1 | 11/2005 | Trandal et al. | |
| 7,076,037 B1 | 7/2006 | Gonen et al. | |
| 7,092,901 B2 | 8/2006 | Davis et al. | |
| 7,103,010 B2 | 9/2006 | Melideo | |
| 7,181,415 B2 | 2/2007 | Blaser et al. | |
| 7,187,761 B2 | 3/2007 | Bookstaff | |
| 7,200,413 B2 | 4/2007 | Montemer | |
| 7,212,615 B2 | 5/2007 | Wolmuth | |
| 7,227,936 B2 | 6/2007 | Bookstaff | |
| 7,231,405 B2 | 6/2007 | Xia | |
| 7,240,110 B2 | 7/2007 | Haitsuka et al. | |
| 7,240,290 B2 | 7/2007 | Melideo | |
| 7,340,048 B2 * | 3/2008 | Stern et al. | 379/218.01 |
| 7,363,254 B2 | 4/2008 | Skinner | |
| 7,434,175 B2 | 10/2008 | Melideo | |
| 2001/0048737 A1 | 12/2001 | Goldberg et al. | |
| 2002/0003867 A1 | 1/2002 | Rothschild et al. | |
| 2002/0010616 A1 | 1/2002 | Itzhaki | |
| 2002/0026457 A1 | 2/2002 | Jensen | |
| 2002/0057776 A1 | 5/2002 | Dyer | |
| 2002/0095331 A1 | 7/2002 | Osman et al. | |
| 2002/0107697 A1 | 8/2002 | Jensen | |
| 2002/0122547 A1 | 9/2002 | Hinchey et al. | |
| 2002/0173319 A1 | 11/2002 | Fostick | |
| 2002/0173981 A1 * | 11/2002 | Stewart | 705/1 |
| 2002/0193094 A1 | 12/2002 | Lawless et al. | |
| 2003/0026397 A1 | 2/2003 | McCroskey | |
| 2003/0046161 A1 | 3/2003 | Kamangar et al. | |
| 2003/0083042 A1 | 5/2003 | Abuhamdeh | |
| 2003/0105824 A1 | 6/2003 | Brechner et al. | |
| 2003/0195787 A1 | 10/2003 | Brunk et al. | |
| 2003/0212600 A1 | 11/2003 | Hood et al. | |
| 2003/0220866 A1 * | 11/2003 | Pisaris-Henderson et al. | 705/37 |
| 2003/0223565 A1 | 12/2003 | Montemer | |
| 2003/0225682 A1 | 12/2003 | Montemer | |
| 2003/0231754 A1 | 12/2003 | Stein et al. | |
| 2004/0003041 A1 | 1/2004 | Moore et al. | |
| 2004/0006511 A1 | 1/2004 | Montemer | |
| 2004/0010518 A1 | 1/2004 | Montemer | |
| 2004/0076403 A1 | 4/2004 | Mankovitz | |
| 2004/0174965 A1 | 9/2004 | Brahm et al. | |
| 2004/0174974 A1 | 9/2004 | Meek et al. | |
| 2004/0193488 A1 | 9/2004 | Khoo et al. | |
| 2004/0234049 A1 | 11/2004 | Melideo | |
| 2004/0235524 A1 | 11/2004 | Abuhamdeh | |
| 2004/0247092 A1 | 12/2004 | Timmins et al. | |
| 2004/0249649 A1 | 12/2004 | Stratton et al. | |
| 2004/0254859 A1 | 12/2004 | Aslanian | |
| 2004/0260413 A1 | 12/2004 | Melideo | |
| 2004/0260604 A1 * | 12/2004 | Bedingfield, Sr. | 705/14 |
| 2005/0018829 A1 | 1/2005 | Baker | |
| 2005/0021492 A1 * | 1/2005 | Safaei et al. | 707/1 |
| 2005/0041647 A1 | 2/2005 | Stinnie | |
| 2005/0074100 A1 | 4/2005 | Lederman | |
| 2005/0076100 A1 | 4/2005 | Armstrong | |
| 2005/0080878 A1 | 4/2005 | Cunningham et al. | |
| 2005/0096980 A1 | 5/2005 | Koningstein | |
| 2005/0100153 A1 | 5/2005 | Pines et al. | |
| 2005/0105881 A1 | 5/2005 | Mankovitz | |
| 2005/0125416 A1 | 6/2005 | Kirsch et al. | |
| 2005/0135387 A1 | 6/2005 | Rychener et al. | |
| 2005/0209874 A1 | 9/2005 | Rossini | |
| 2005/0216186 A1 * | 9/2005 | Dorfman et al. | 701/207 |
| 2005/0240432 A1 | 10/2005 | Jensen | |
| 2005/0245241 A1 | 11/2005 | Durand et al. | |
| 2005/0261964 A1 | 11/2005 | Fang | |
| 2005/0286688 A1 | 12/2005 | Scherer | |
| 2005/0289015 A1 | 12/2005 | Hunter et al. | |
| 2006/0003735 A1 | 1/2006 | Trandal et al. | |
| 2006/0004627 A1 | 1/2006 | Baluja | |
| 2006/0069610 A1 | 3/2006 | Rossini | |
| 2006/0106711 A1 | 5/2006 | Melideo | |
| 2006/0106778 A1 | 5/2006 | Baldwin | |
| 2006/0136310 A1 | 6/2006 | Gonen et al. | |
| 2006/0159063 A1 | 7/2006 | Kumar | |
| 2006/0166655 A1 | 7/2006 | Montemer | |
| 2006/0171520 A1 | 8/2006 | Kliger | |
| 2006/0173827 A1 | 8/2006 | Kliger | |
| 2006/0173915 A1 | 8/2006 | Kliger | |
| 2006/0182250 A1 | 8/2006 | Melideo | |
| 2006/0247999 A1 | 11/2006 | Gonen et al. | |
| 2007/0038507 A1 | 2/2007 | Kumar | |
| 2007/0100802 A1 * | 5/2007 | Celik | 707/3 |
| 2007/0129054 A1 | 6/2007 | Andronikov et al. | |
| 2007/0269038 A1 | 11/2007 | Gonen et al. | |
| 2008/0128483 A1 * | 6/2008 | Asa | 235/375 |
| 2008/0162301 A1 * | 7/2008 | Tomita et al. | 705/26 |
| 2009/0254824 A1 * | 10/2009 | Singh | 715/716 |
| 2010/0027527 A1 * | 2/2010 | Higgins et al. | 370/351 |
| 2011/0035401 A1 * | 2/2011 | Nye | 707/769 |
| 2012/0284613 A1 * | 11/2012 | McCrossin et al. | 715/234 |
| 2014/0337938 A1 * | 11/2014 | Abhyanker | 726/5 |

FOREIGN PATENT DOCUMENTS

| | | |
|---|---|---|
| KR | 20040082556 | 9/2004 |
| KR | 20050099789 | 10/2005 |
| WO | 9847295 | 10/1998 |
| WO | 0057326 | 9/2000 |
| WO | 0127825 | 4/2001 |
| WO | 0128141 | 4/2001 |
| WO | 2008058295 | 5/2008 |

OTHER PUBLICATIONS

"ITXC Corp and Doubleclick Energize Banner Ads with Web Telephony; Companies Voice-Enable Banner Advertisements Using ITXC Push to Talk Service," Business Wire, Dec. 12, 2000.

ADS-CLICK, "ADS-click Adds Skype-Based Pay-Per-Call Advertising Capabilities to Its Private-Labeled Solution, which will be Unveiled at ad:tech New York," Market Wire, Oct. 10, 2005.

(56) References Cited

OTHER PUBLICATIONS

Greenberg, Ken, "Jambo Launches to Connect People and Businesses from the Internet to the Phone," Market Wire, May 3, 2005.

Greenberg, Ken, "Jambo Names Netzero Co-founder Stacy Haitsuka to New Post of Chief Information Officer," Business Wire, Jul. 5, 2005.

Greenberg, Ken, "Jambo Receives $5 Million in Financing from Kline Hawkes & Co., Westlake Venture Partners, Others," Business Wire, Oct. 17, 2005.

Ingenio, Inc., "FindWhat.com Enters Agreement with Ingenio to Offer Pay Per Call Advertising Platform," press release available at http://www.ingenio.com, Apr. 7, 2004.

Jambo, "Welcome to Jambo—The Leader in Pay-Per-Call Solutions," company information retrieved from http://www.jambo.com, available at least by Oct. 17, 2005.

Jingle Networks, Inc., "1-800-FREE411 Provides Two Great Opportunities to Acquire New Customers," available at least by Oct. 20, 2005.

Jingle Networks, Inc., "Introducing 1-800 FREE411: First Nationwide Free Telephone Directory Assistance Service," Sep. 20, 2005.

International Application No. PCT/US2007/084452, Written Opinion and International Search Report, Mar. 6, 2008.

Carlson, Nicholas, "Advertising on Google Earth?" located at http://www.internetnews.com/xSP/article.php/3594841, Mar. 28, 2006.

O'Byrne, Fergal, "Google Earth—Is it Online Advertising?" Online Marketing, located at http://fergalobyrne.typepad.com/online_marketing_new_idea/2005/09/google_earth_is.html, Sep. 9, 2005.

Shaffer, Scott P., "Free Advertising on Google?" located at http://theponderingprimate.blogspot.com/2005/09/free-advertising-on-google.html, Sep. 11, 2005.

ISA/US, International Search Report for International Application No. PCT/US05/12061, 3 pages, Nov. 17, 2006.

* cited by examiner

FUNCTIONAL DESCRIPTION OF SYSTEM

→ 114

SCROLL DOWN to see more listings      Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS      scroll down for more listings

Dream Car Rentals                                                Cite Gold
3734 Las Vegas Blvd.
LAS VEGAS, NV
Phone: (702) 555-6661
Fax: (702) 555-6665
We Specialize in Excitement! Ferrari's. Viper's
Porsche's & Hummers. Harley-Davidson's
and SUV's "DRIVE THE DREAM"

Cite Gold

RENT-A-VETTE
5021 SWENSON STREET
LAS VEGAS, NV 89119
Phone: (702) 555-2692
Fax: (702) 555-2044

ONLINE LISTINGS                    scroll down for more listings

Expedia: For All Your Car Rental Needs http://www.expedia.com
Save with Expedia.com, your one-stop source for flights, hotels, vacation packages, cruises, and rental

FIG. 9

SYSTEMS AND METHODS TO PROVIDE A COMMUNICATION REFERENCE IN A REPRESENTATION OF A GEOGRAPHICAL REGION

The present patent application is related to: U.S. patent application Ser. No. 11/077,655, filed Mar. 10, 2005 and claimed priority from Provisional U.S. Patent Application 60/653,708 filed on Feb. 16, 2005, Provisional U.S. Patent Application Ser. No. 60/568,156 filed on May 4, 2004, Provisional U.S. Patent Application Ser. No. 60/560,926 filed on Apr. 9, 2004 and Provisional U.S. Patent Application Ser. No. 60/552,124 filed on Mar. 10, 2004; U.S. patent application Ser. No. 11/092,309, filed Mar. 28, 2005 and claimed priority from Provisional U.S. Patent Application 60/653,660 filed on Feb. 16, 2005; U.S. patent application Ser. No. 11/095,853, filed Mar. 30, 2005 and claimed priority from Provisional U.S. Patent Application 60/653,661 filed on Feb. 16, 2005; U.S. patent application Ser. No. 11/014,073, filed Dec. 15, 2004; U.S. patent application Ser. No. 10/872,117, filed Jun. 17, 2004; U.S. patent application Ser. No. 11/021,939, filed Dec. 23, 2004; U.S. patent application Ser. No. 10/679,982, filed Oct. 6, 2003; and Provisional U.S. Patent Application 60/761,929, filed on Jan. 24, 2006. The disclosures of the above referenced prior applications are incorporated herein by reference.

TECHNOLOGY FIELD

At least some embodiments of the present invention relate communications and business promoting in general and performance-based business promotion in particular.

BACKGROUND

Telephone systems allow users to conduct real-time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY OF THE DESCRIPTION

Systems and methods to provide references for communication with a business in a representation of a geographical region are described here. Some embodiments are summarized in this section.

One embodiment includes providing a reference for real-time communication with a business to be placed in a representation of a geographical region at a location within the representation corresponding to a location of the business; tracking usage of the reference; and billing the business for providing the reference for real-time communication based on quantitative usage of the reference.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 9 shows an example of a search engine result page, which includes an advertisement generated, in accordance with one embodiment of the present invention.

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
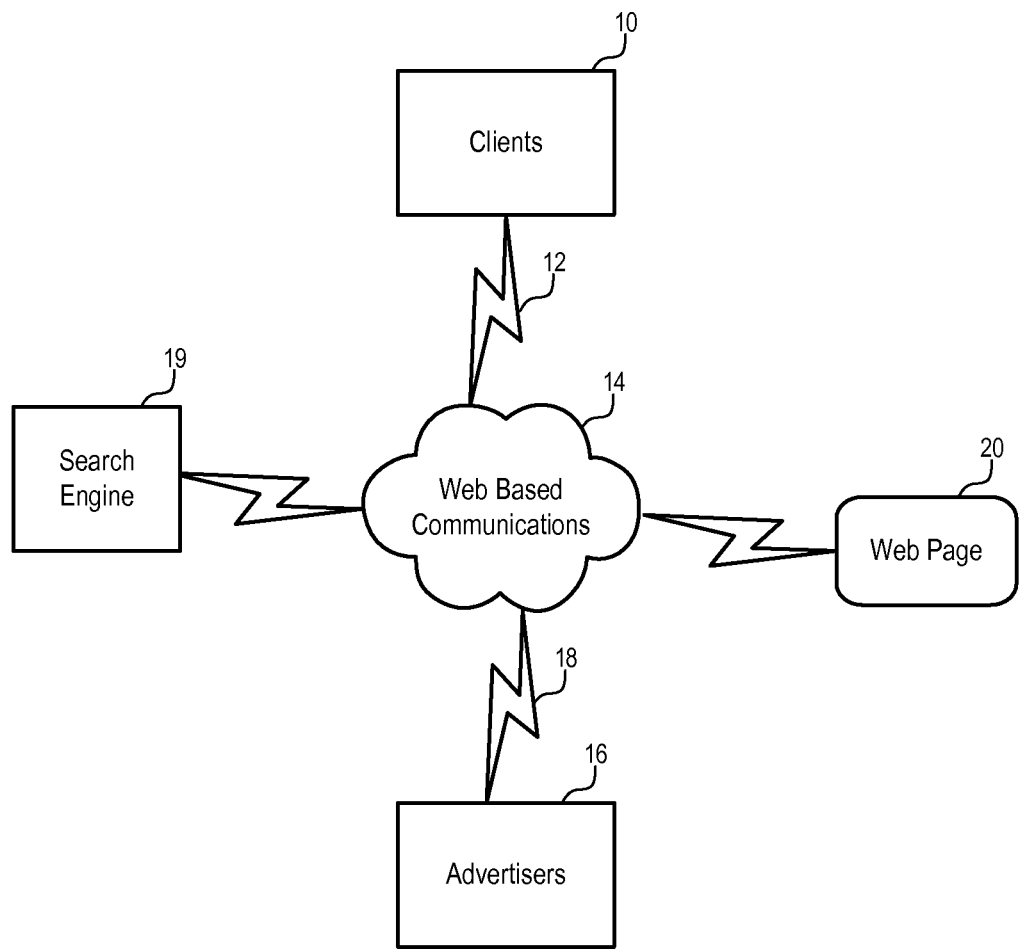
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
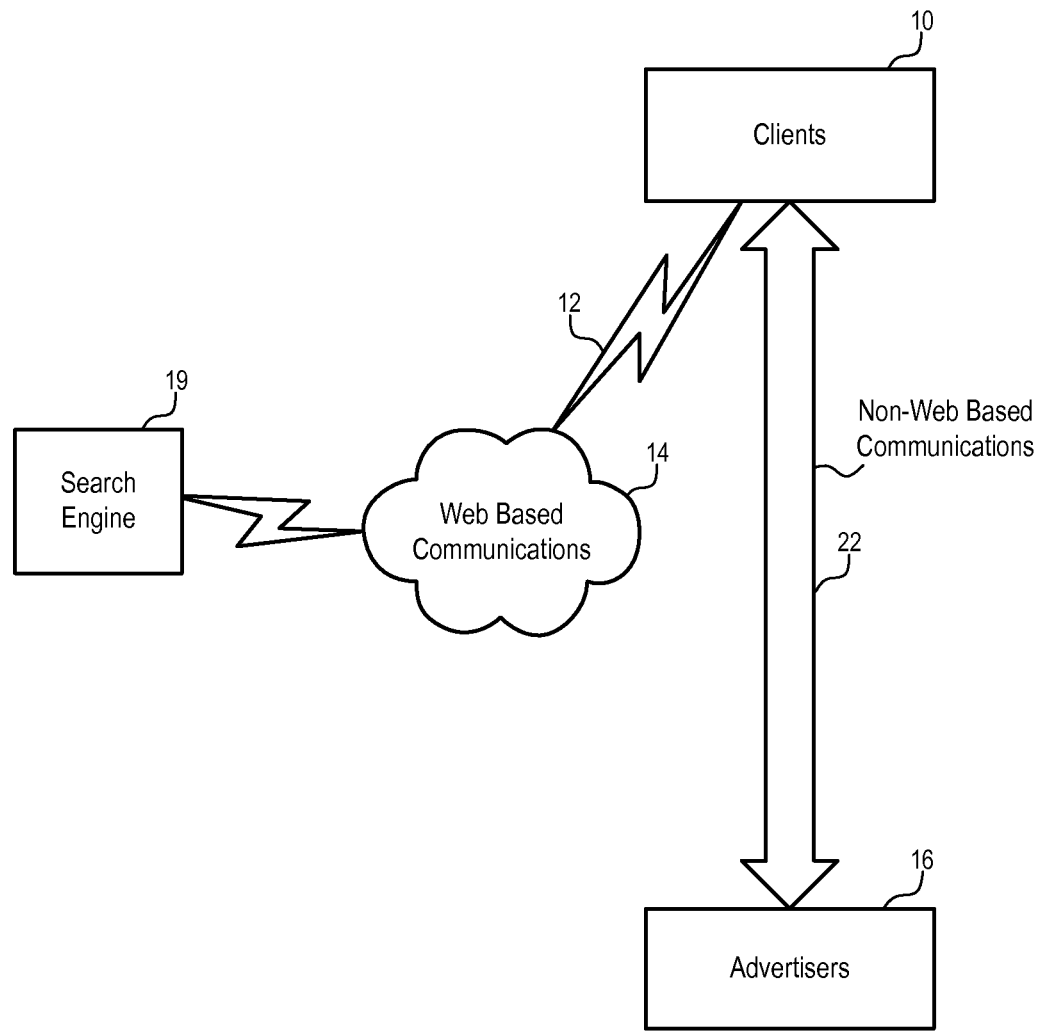
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
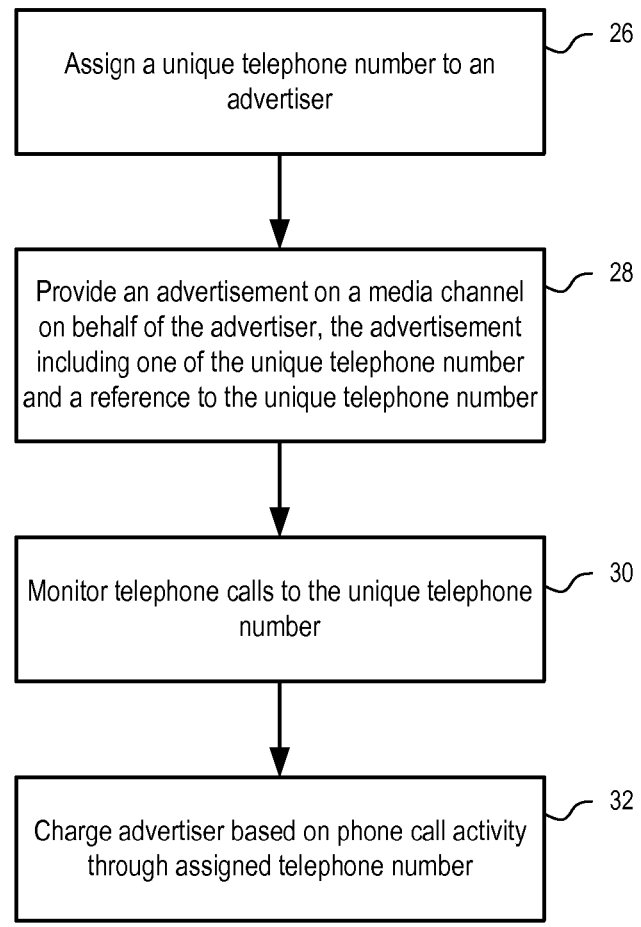
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
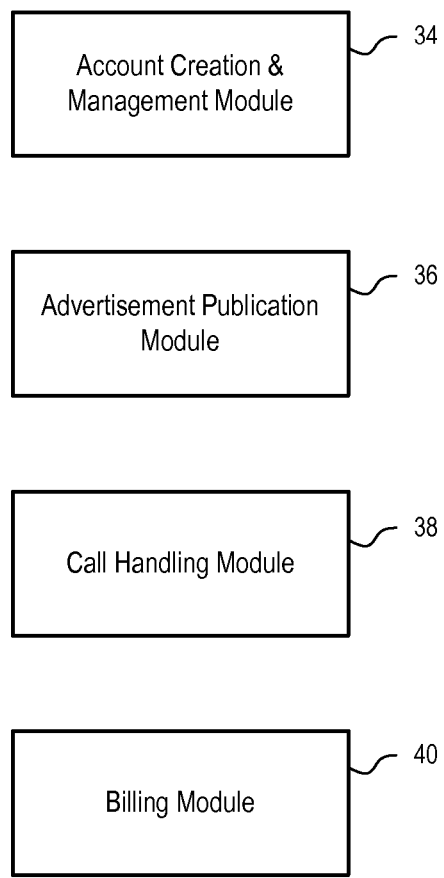
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
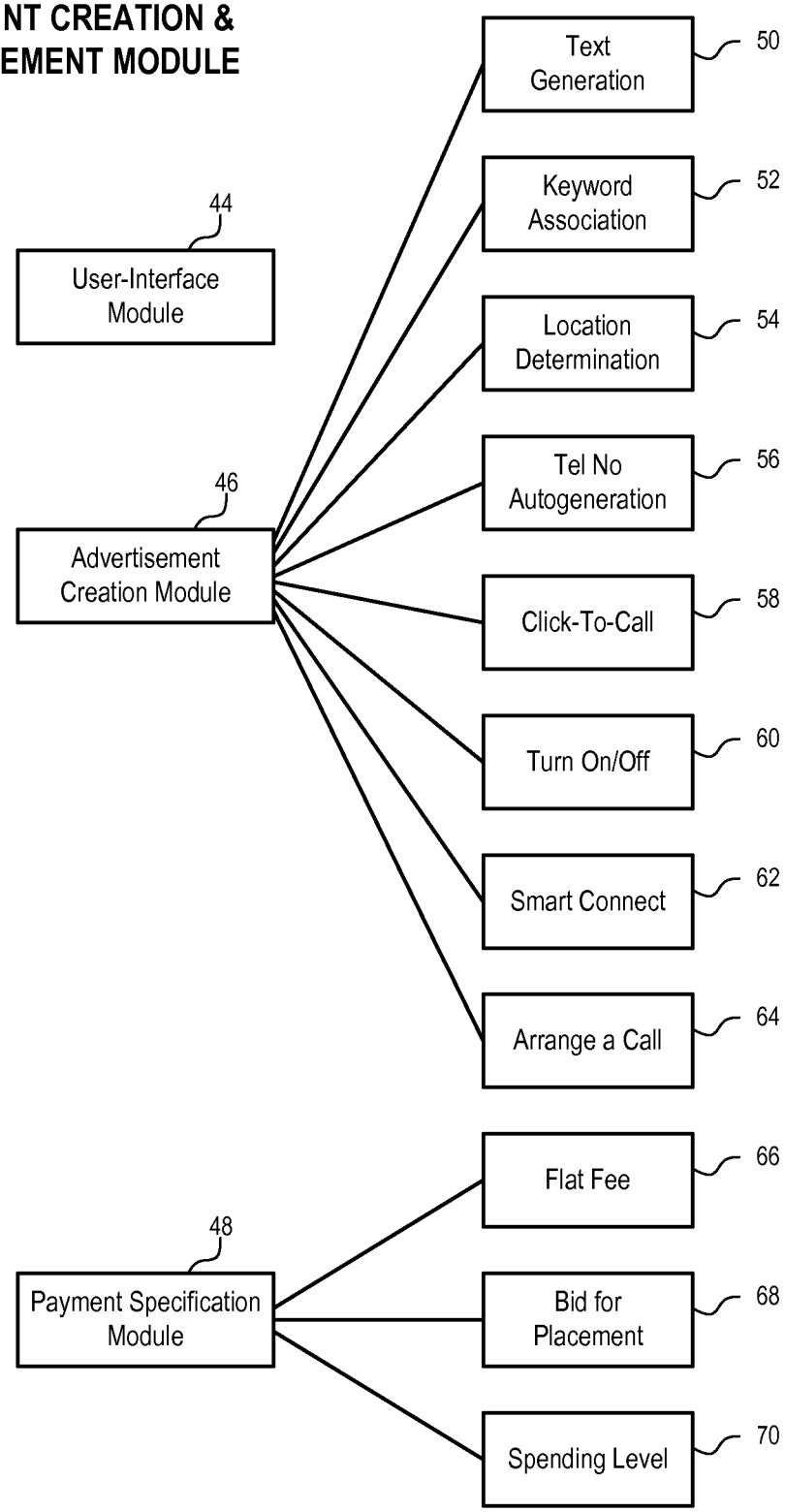
FIG. 5 illustrates the Account Creation and Management module of the system, in greater detail.
Figure 8A:
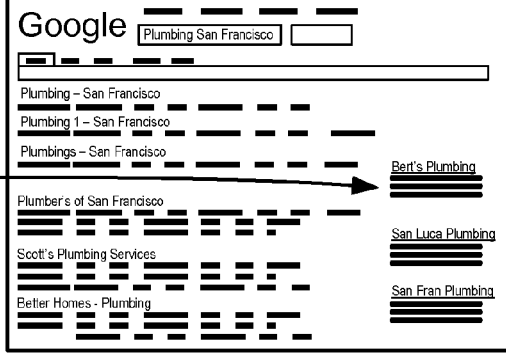
FIG. 8A shows an example of a user interface that may be presented to a user during advertisement creation, in accordance with one embodiment of the present invention.
Figure 8B:
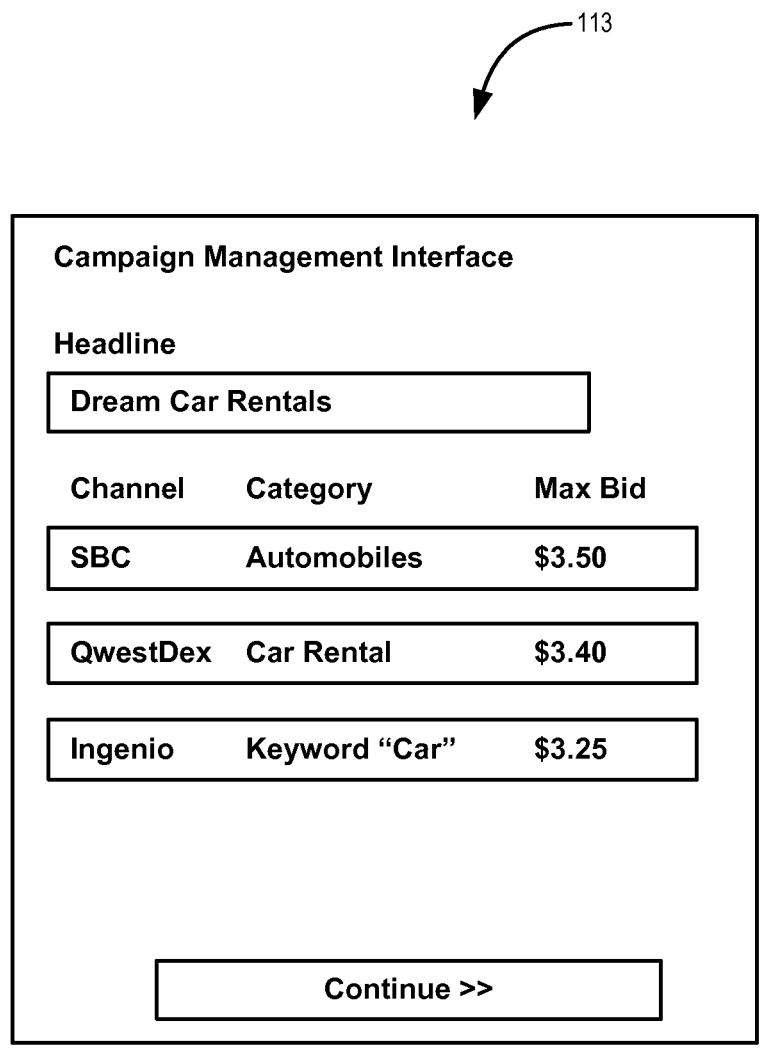
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
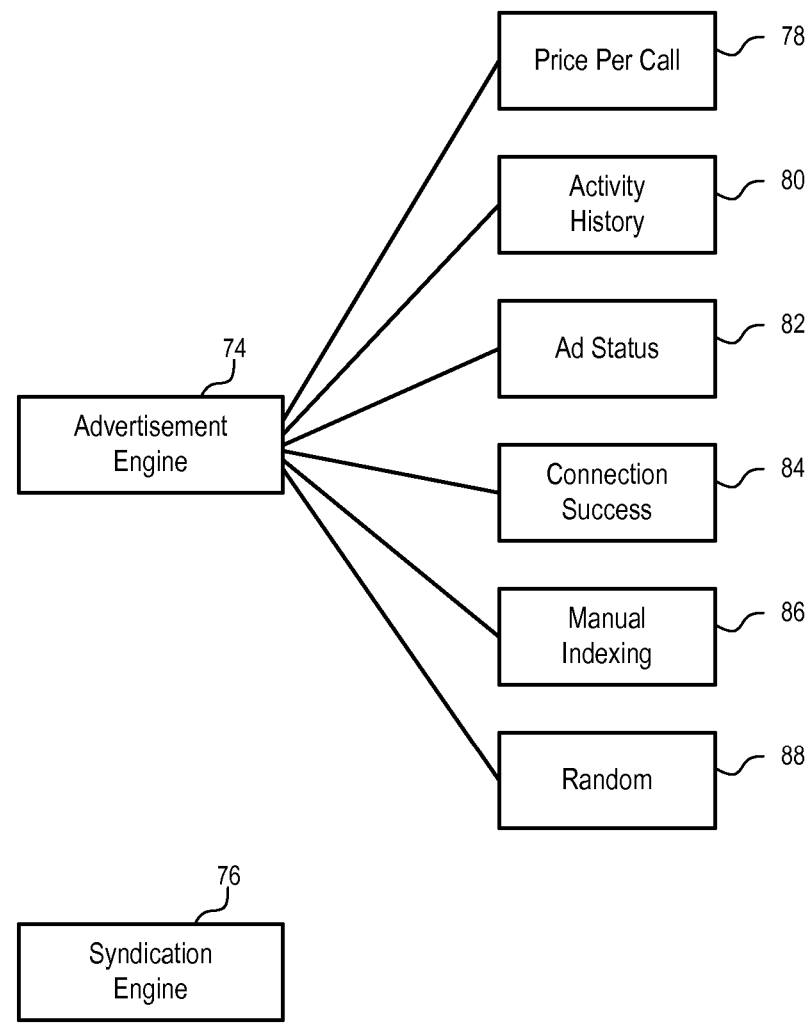
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real-time communication references (e.g., traditional telephone numbers, SIP address, user ID of instant messaging system, etc.).

Figure 7:
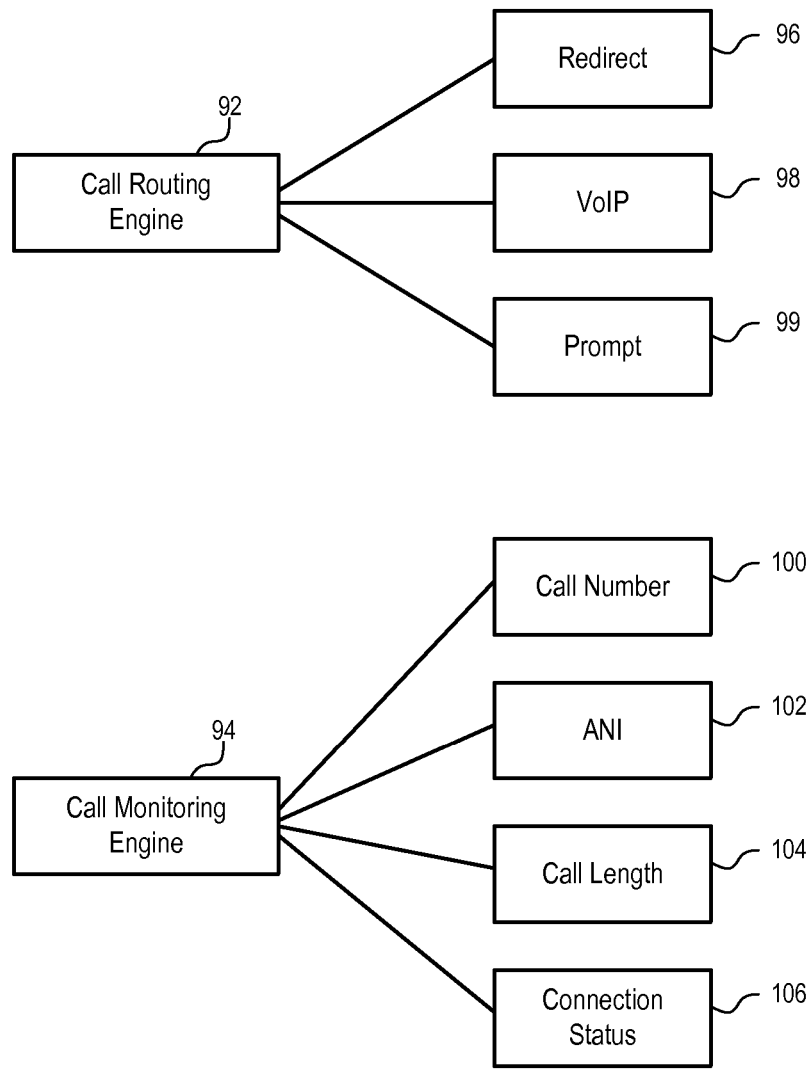
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
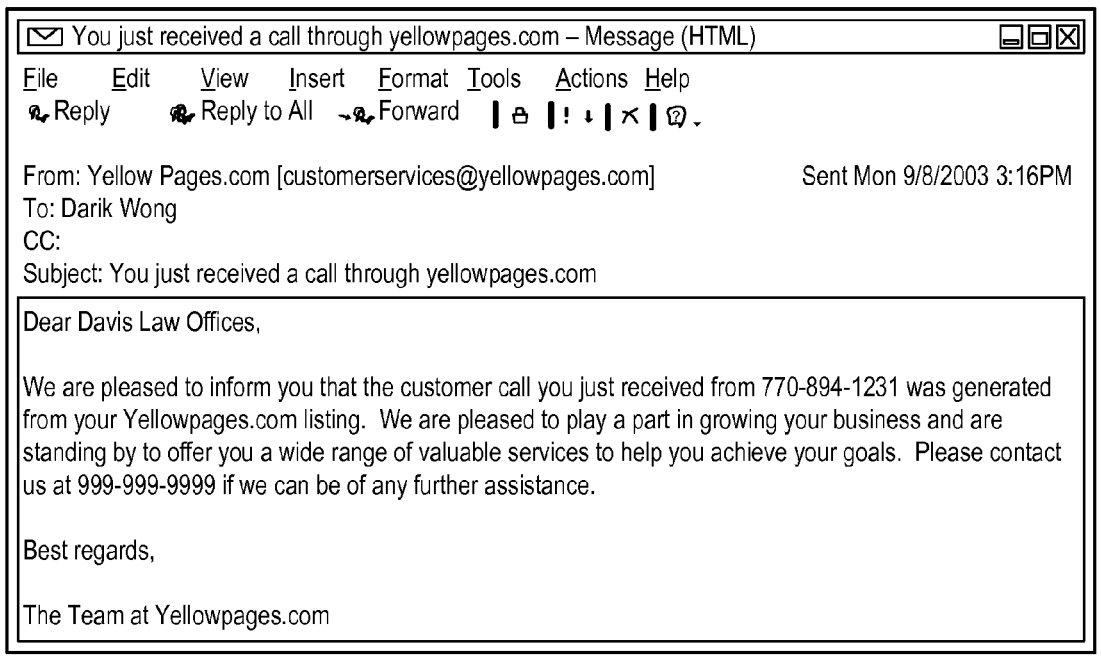
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
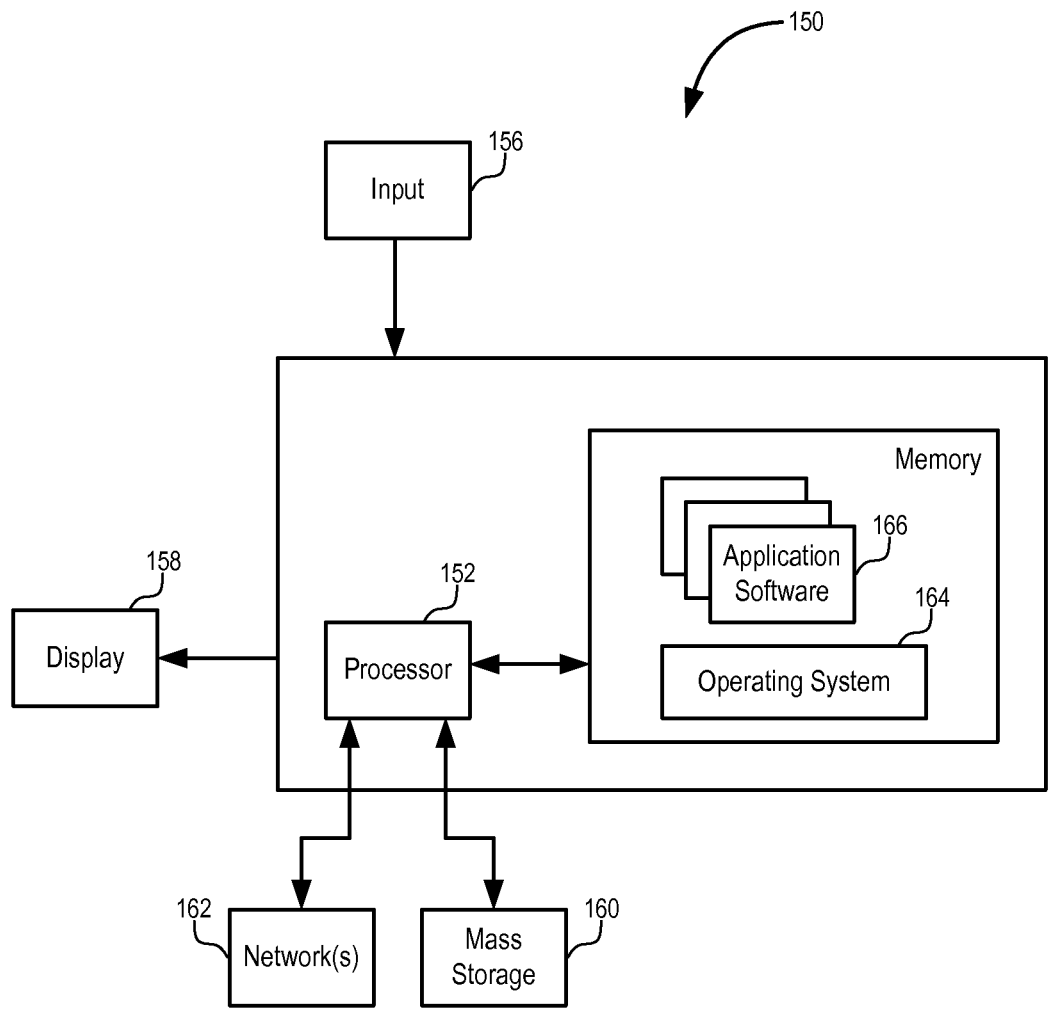
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
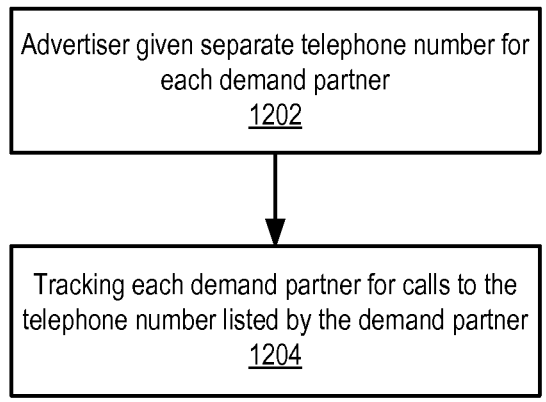
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
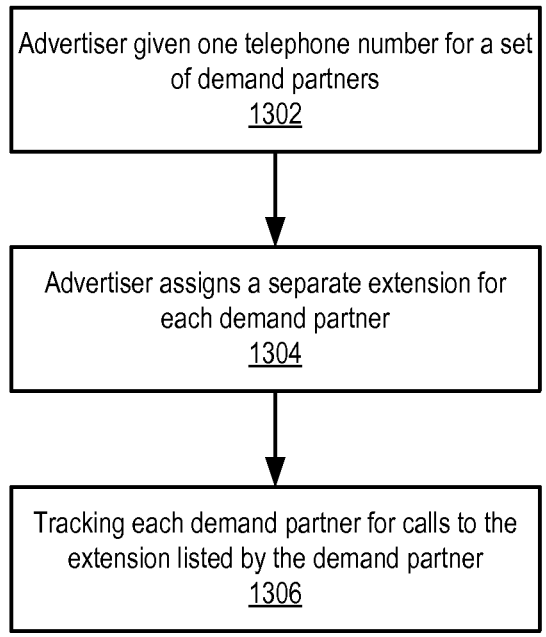

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
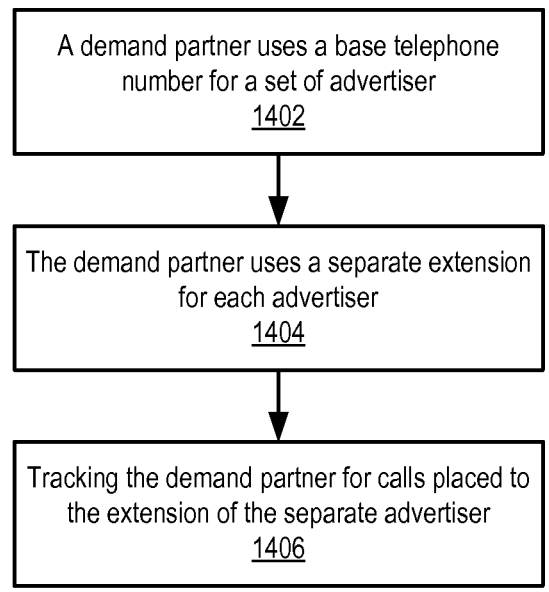

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
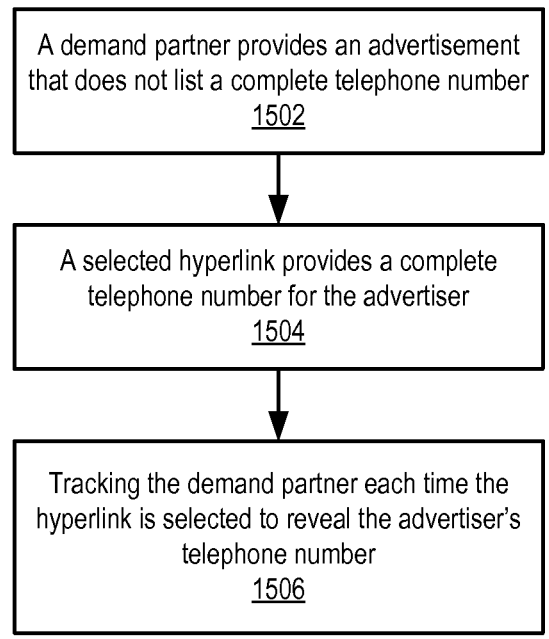

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
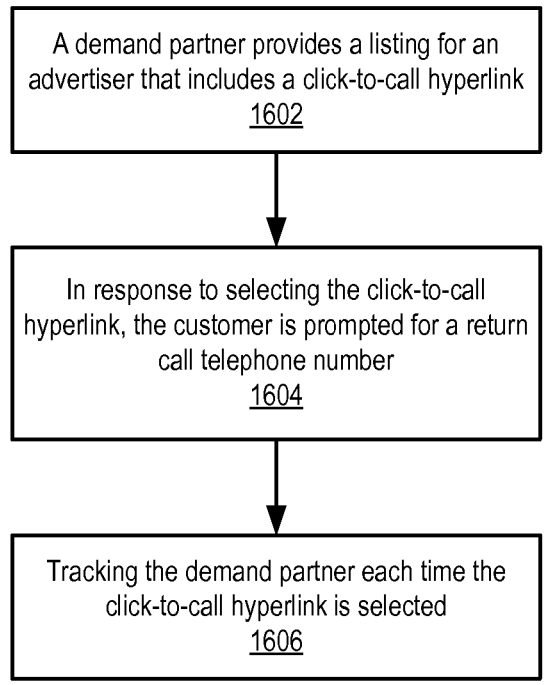

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
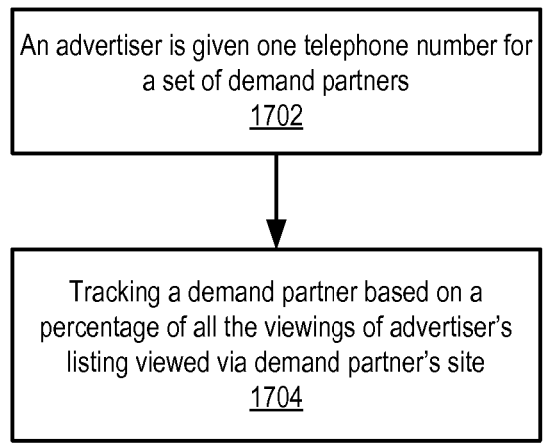

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
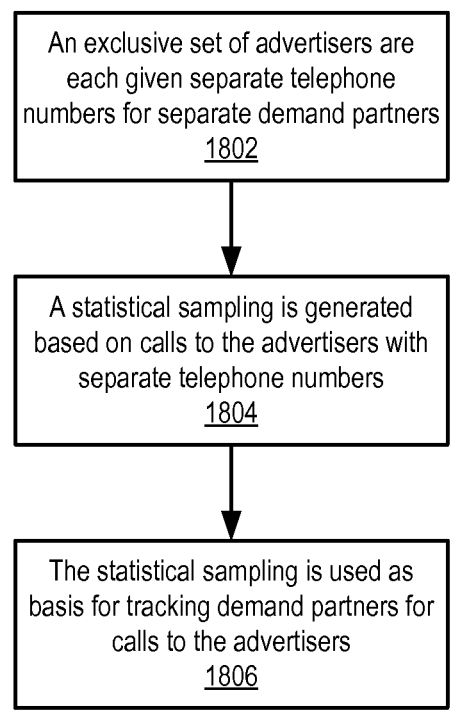

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 19:
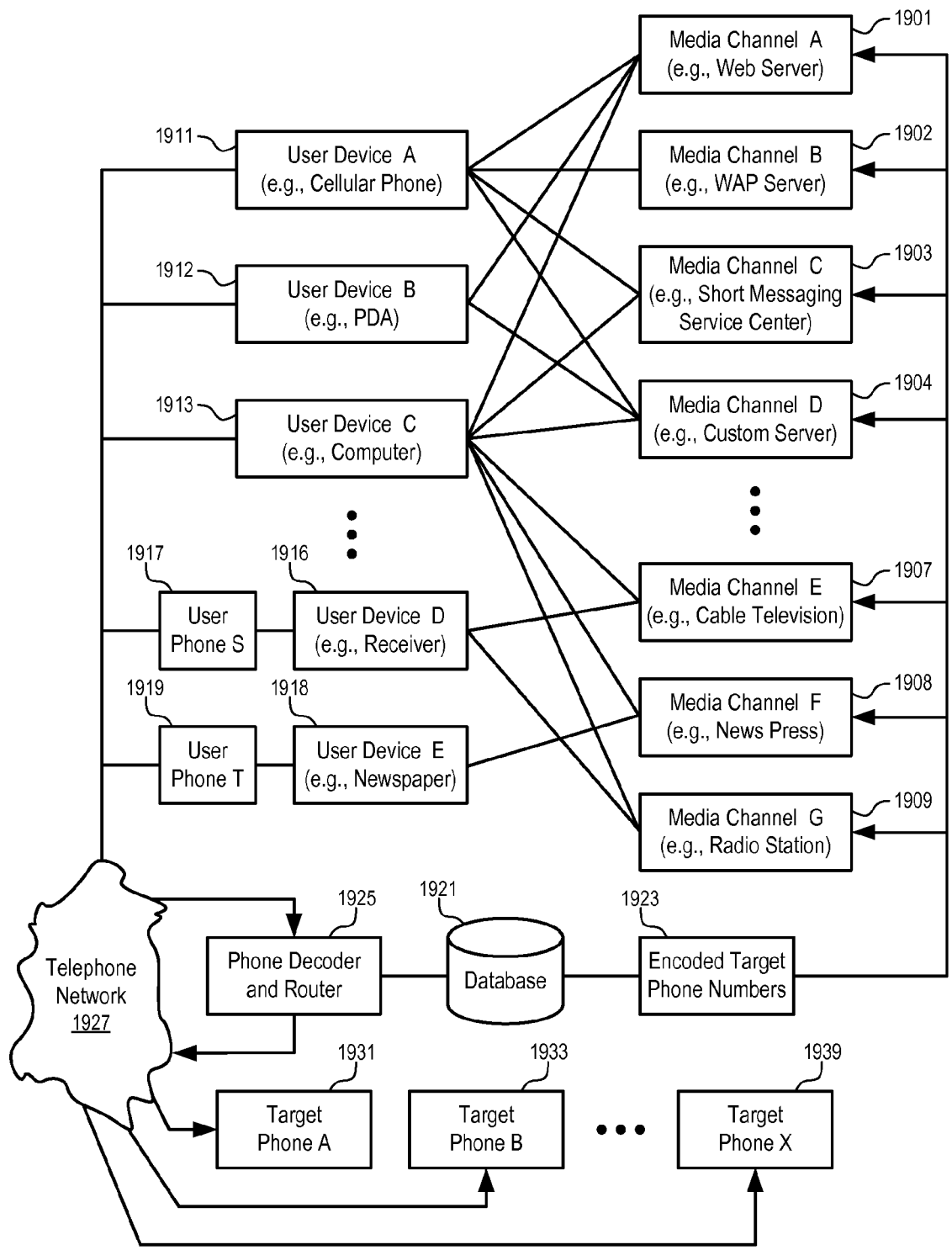
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real-time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins/bridges the phone calls so that the user can talk to the target phone.

In one embodiment of the present invention, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encode target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Advertisement Presentation

Figure 20:
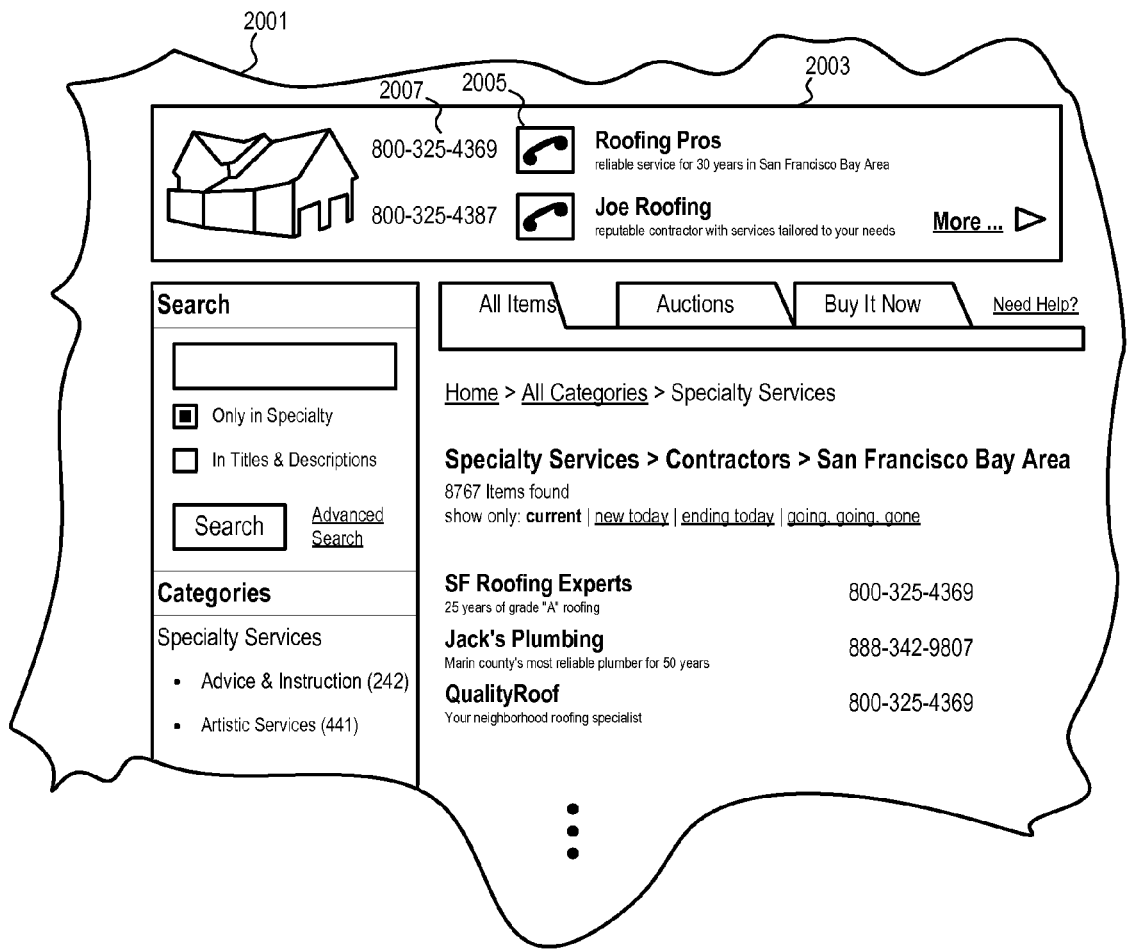
FIG. 20 illustrates an example of displaying advertisement listings in a banner according to one embodiment of the present invention.

FIG. 20 illustrates an example of displaying advertisement listings in a banner according to one embodiment of the present invention.

In FIG. 20, a banner advertisement (2003) is displayed within a web page (2001). The web page (2001) may be rendered for display from one or more files, one of which may be a main file in a markup language (e.g., HyperText Markup Language (HTML) or an EXtensible Markup Language (XML)) or in other formats such as a custom designed format. The main file may contain references to other files such that when the main file is rendered in a browser, the one or more files are processed to generated the display of the web page (2001).

The banner advertisement (2003) includes one or more listings. Each of the listings contains one or more references for requesting a two-way real-time communication connection with the corresponding advertiser, such as a telephone number that can be called to reach the advertiser (e.g., through a connection system), or a call button which can be selected to request a VoIP call to the advertiser. The telephone number may or may not include an extension. The telephone number may include a vanity number which spells a word or phrase on the phone keypad. The request may be made through initiating the real-time communication connection from the user of the web page (2001) to a connection system using the reference, or through sending a message to the connection system which can initiate the real-time communication connections to the user of the web page (2001) and the advertiser selected by the user and join the connections to connect the user and the advertiser. Alternatively, or in combination, the listings can contain links which when selected (e.g., clicked) reveal the contact information of the advertisers, such as the telephone numbers of the advertisers and/or address information (e.g., email address, instant messaging user ID). In one embodiment, when the contact information is revealed through dynamically modifying the web page that contains the listing. Alternatively, a new web page, or a popup window, or a layer over the existing web page can be displayed to show the contact information. In one embodiment, the listings include links which when selected (e.g., clicked) cause the system to initiate a VoIP call to the advertiser.

In one embodiment, the two-way real-time communication connection can be made through a monitoring/tracking system to determine the number of two-way real-time communication connections established based on the banner and/or determine the time period of the real-time communication between the user and the advertiser.

The advertiser may sell products or services. For example, the advertiser may provide services, such as advice, information, entertainment and/or amusement, over the real-time communication connection, which may be a telephonic connection, an instant messaging connection, a video conferencing connection, a text chat connection, a common whiteboarding connection, etc.

In one embodiment of the present invention, the banner advertisement (2003) may include multiple listings. At a given time, a portion of multiple listings is displayed. The listings are animated or rotated to show the multiple listings over a period of time.

In one embodiment of the present invention, at least a portion of banner advertisement can be selected by the user to request a telephonic connection via a VoIP system. The telephonic connection may be initiated from a VoIP client application running on a computer on which the web page (2001) is rendered and displayed. Alternatively, the request may be sent to a server remote to the computer which renders and displays the web page (2001); and the server then initiates the telephonic connection.

In one embodiment, the user may manually dial the phone number (e.g., 2007) displayed in the banner to request the telephone connection. A server at the phone number (e.g., 2007) can receive the phone call and determine the corresponding advertiser (e.g., based on the phone number dialed by the caller to reach the server and/or an extension dialed after the server picks up the call) and connect the telephone call to the advertiser. In one embodiment, the advertisement is presented on behalf of more than one advertiser (or an advertiser that has different offices, branches, extensions, etc.). When the phone call is received as a result of the advertisement, a live operator or an IVR system can interact with the caller to route the call to a selected one of the advertisers (or a selected office, branch, or extension of the advertiser). Alternatively, the system may make the selection automatically based on considerations such as the availability of the advertisers, the current bids of the advertisers for phone leads generated from the advertisement, the geographical locations of the caller and the advertisers, and/or one or more specific requests/selection criteria received from the caller over the phone, etc.

Traditionally, banner advertisements are designed to direct the web traffic to the web site of the advertiser, from the site that provides the web page and/or the banner advertisements. The banner advertisement may be paid based on impression or click through. An impression of the banner advertisement occurs when the banner advertisement is loaded from the web site into a web browser for display. A click through of the banner advertisement occurs when the user of the web browser selects the banner to cause the web browser to load the web page of the advertiser.

In one embodiment of the present invention, the banner is designed be selected to "call through" to the advertiser, instead of "click through" to the web site of the advertiser. For example, in FIG. 20, when the icon (2005) is clicked, a telephone call may be initiated to the advertiser. The click may lead the web browser to load the web page of a service agent which provides the services of connecting the advertiser and the user for real-time communication and tracking the real-time communication connections. For example, the web site of the service agent may provide detailed information on how to go through the process of connecting to the advertiser. The web page of the service agent may provide services to schedule/arrange the call when the advertiser is currently available for the real-time communication or will be available for the real-time communication in a period of time. When the advertise is not available for the real-time communication with the user for a longer period of time, the web site of the service agent may present an option to schedule an appointment with the advertiser for the user. The web page of the service agent may request a communication reference to call back to the user of the web page (2001) and/or a time period within which the user would be available for the real-time communication.

Alternatively, the selection of the icon (e.g., 2005) may cause the web browser to initiate a telephonic call (e.g., through loading a VoIP module such as a plug-in to the web browser, or a VoIP helper application which is an application separate from the web browser and which can make a VoIP based phone call based on parameters passed from the web browser).

The banner advertisement (2003) can may be rendered from one or more components, such as an image (e.g., in a GIF or JPEG format), a JavaScript program and/or a multimedia object with a scripting language such as Java, or a file/data for other application modules such, Shockwave or Flash. These components may be in separate files or in one file.

The banner advertisement (2003) may animate one or more listings and/or provide sound to improve user experiences. The banner advertisement (2003) may include the indication of the current availability status of the advertiser to perform the real-time communication (e.g., using the icon (2005)). The banner advertisement (2003) may further include a brief description of the advertiser and/or other information about the advertiser, such as the qualification as an advisor in a field, a quality rating based on prior customer feedback, language capability, etc.

In one embodiment, the layout of at least a portion of the listing presented in the banner is designed and provided by the advertiser. Alternatively, the advertiser may provide a portion of the content; and the listing is automatically formatted to include the content provided by the advertiser.

The banner may be wide and short, suitable for being placed on the top (or bottom) of the web page (or a section of the web page). The banner may be tall and narrow, suitable for being placed on the side (e.g., left or right) of the web page (or a section of the web page). A banner may also be so big that it takes up most of the page. In general, a banner can be generated for presentation in any size and shape. In one embodiment, a banner has a dynamically changeable size. For example, a banner shows an initial set of listings with a link or button. When the link or button is selected, the banner shows additional listings by dynamically changing the banner in the web page, without reloading a separate web page or refreshing the entire web page; and the size of the banner is dynamically changed to accommodate the additional listings. Alternatively, the banner may have a fixed size; and the additional listings replace the previously displayed listings. Alternatively, more listings may be displayed in a separate banner, or in a separate web page, or in a popup window, or in a layer over the current web page, when the link or button is selected for more listings. The additional listings may be pre-fetched from the web site together with the web page. Alternatively, the additional listings may be obtained from the web site in response to the selection of the link or button (e.g., after the display of the web page).

The one or more listings presented in the banner may be selected dynamically from a database of listings, based on the content of the web page so that the listings may be of interest to a typical reader of the web page. Further, the selection of listings for inclusion in the banner may be based on the prices specified by the advertisers. The prices may be charged by the advertiser to the caller when the caller calls the advertiser for advice, for information, or for entertainment (e.g., on a per minute basis). The prices may be charged to the advertiser for the advertisements based on the number of calls the advertisers receive from the advertisements (e.g., on a per call basis). In one embodiment, a banner has dynamic content based on the page in which the banner is located. For example, the content of the banner in a web page can be determined dynamically based on one or more search parameters presented in a search box of the web page. For example, Bob's Plumbing site can have a search box which allows a customer to search for plumbing resources in Boston, Mass. The search results on the page may have many resources on plumbing in Boston, Mass.; and the banner can dynamically present advertisers in Plumbing for Boston based on the search parameters. The banner may also provide advertisements for service, information or entertainment in Boston, Mass. Alternatively, the web page owner can select to have banners display certain types of listings when setting up the banner advertisement relationship with an advertisement agency, who provides the content of the banners. For example, Joe's Seattle Electrician Help Site can choose to have static banners of electricians in Seattle from the list of advertisers of the advertisement agency, or dynamic banners of electricians that are selected randomly (or selected based on a set of rules). In one embodiment, the banner can determine the content of the web page in which the banner is located (e.g., through analyzing the HTML document of the web page) and select advertisements based on the content of the web page. In one embodiment, a banner may utilize data storage mechanism in the web browser (e.g., cookies) to collect information about the identity of the user of the web browser and/or the preference of the user to customize the selection of advertisements for the user. In one embodiment, statistical data related to the presentation of advertisements to the user and the user interaction with advertisements is collected (e.g., using the information that identifies the user); based on the statistical data the preference of the user can be identified, which can be used in selecting advertisements of interest to the user.

In one embodiment of the present invention, a service agent can provide the services of arranging advertisements (e.g., service listings, product listings, advertisements for services, products, entities, individuals, etc.) on one or more media channel for advertisers. The service agent purchases/pays for banner advertisement placements from operators of media channels, such as search engine operators, or operators of frequently visited web sites (e.g., such as newspaper or entertainment sites). The service agent may pay for the placements of banner advertisement on the media channels, based on a conventional scheme, such as based on the number of impressions of banner advertisements or based on the number of click through from the banner advertisements (e.g., click through to the site of the service agent to initiate the communication connection between the user and the advertiser). The service agent can use the placements of banner advertisements to present advertisement listings for which the advertisers (e.g., sellers or advisors) pay based on the establishment of real-time communication connections, such as the telephone connections.

For example, the service agent may present the pay per call advertisement listings for one or more advertisers in a banner advertisement at a web site. The service agent pays the operator of the web site for the banner advertisement on a per impression basis or on a per click through basis. The service agent charges the one or more advertisers for the advertisement listings based on the number of telephone calls generated from advertising on behalf of them.

Alternatively, or in combination, the service agent may pay the operators of the media channels a percentage of the advertisement fees collected from the advertisers for the placements of the banner advertisements in the media channels. The service agent may track the establishment of telephone calls to determine the media channels who are responsible for presenting the banner advertisements that result in the telephone calls to the advertisers. The service agent may determine the number of telephone calls generated from the banner advertisements on the respective media channels and to compensate the operators of the media channels according to the number of telephone calls initiated from the banner advertisements presented by the respective media channels. Alternatively, or in combination, the service agent may pay the media operators a pre-determined fee (e.g., a monthly fee) for the placements of the banner advertisements. Alternatively, or in combination, the service agent may pay the media operators according to a price bid specified by service agent for click through or for impression. The price bid may not be proportional to any pay per call price bids by the advertisers. The service agent may determine a price bid based on statistic data to improve profits.

In another example, the service agent may use the banner advertisements in the media channels to present the listings for providers who provide services (e.g., advice, information, entertainment) over real-time communication connections, such as telephone connections, instant messaging connections, video conferencing connections, text and/or voice chatting connections, common white-boarding connections, etc. The connections may be used to provide live voice communications, live video communications, live text communications, or recorded communications, such as video/audio clips, television programs, or a combination of these. The service agent may determine the duration of the real-time communications. The customers who request the real-time communication connections with the information/service providers can be charged based at least on the duration of the real-time communications and/or prices (rates) specified by the information/service providers. The prices (rates) specified by the information/service providers may be presented as part of the advertisement listings or provided when the user clicks through the banner, or when the user starts the real-time communication connection using the reference provided in the banner (e.g., by calling the phone number presented in the listing).

The banner advertisement may statically show one or more listings in the banner. The banner advertisement may rotate multiple listings in the banner periodically so that the banner can display more listings over a period of time than that can be display at a given time instance within the display area of the banner advertisement. The banner may further interact with the user to selectively display one from multiple listings.

Figure 21:
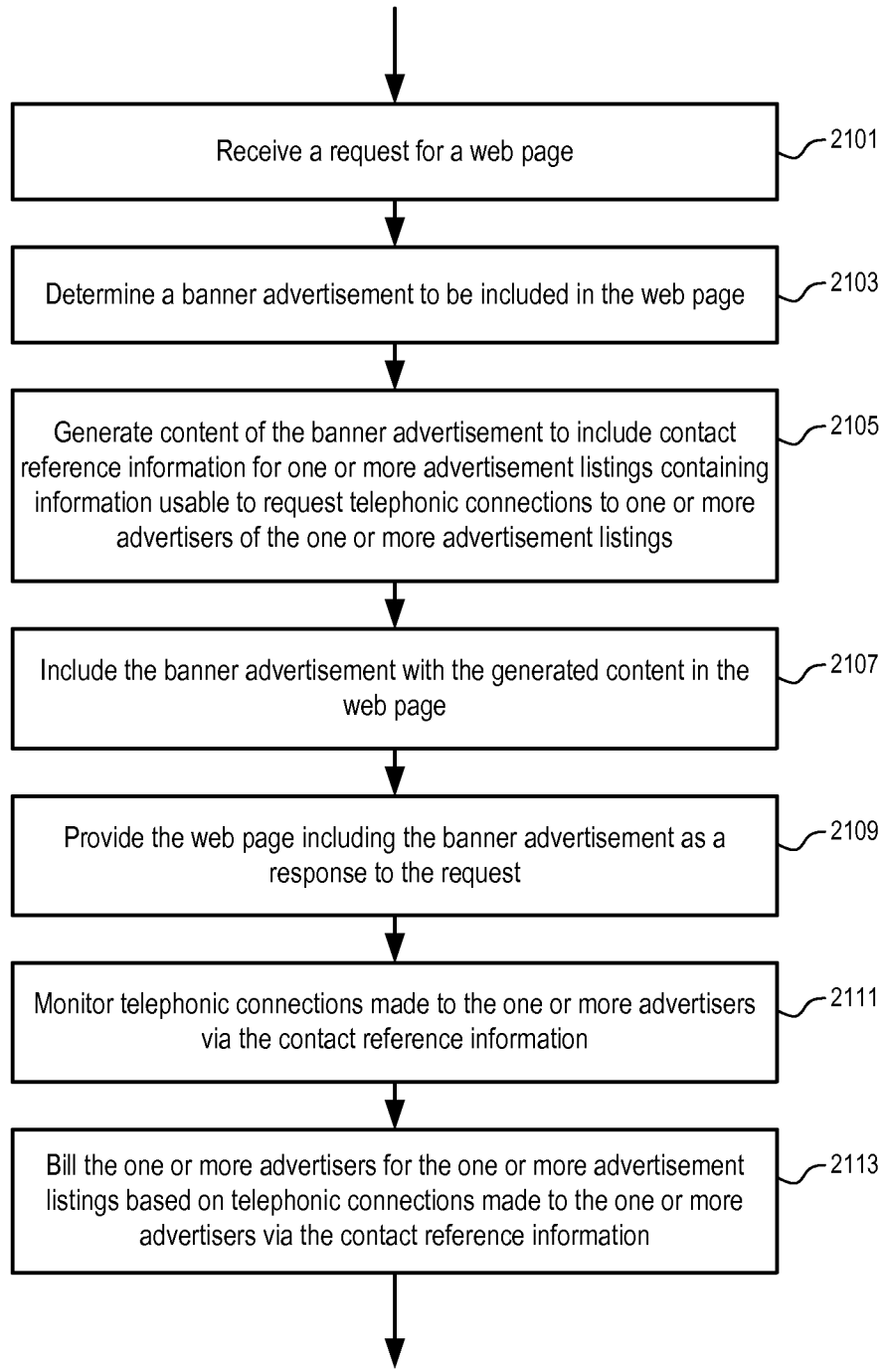
FIG. 21 shows a method to present advertisements according to one embodiment of the present invention.

FIG. 21 shows a method to present advertisements according to one embodiment of the present invention. In FIG. 21, after a request for a web page is received (2101), a banner advertisement to be included in the web page is determined (2103). The web page may be in a HyperText Markup Language (HTML) format, with or without references to one or more components which can be in other formats, such as graphics, scripting code, data for application modules or external applications, etc. The web page may be in other markup languages, such as an EXtensible Markup Language (XML) format. The web page may be provided to a browser through a HyperText Transfer Protocol (HTTP) server or other types of servers, such as a File Transfer Protocol (FTP) server, a Wireless Application Protocol (WAP) server, etc.

Operation 2105 generates content of the banner advertisement to include contact reference information for one or more advertisement listings, containing information usable to request telephonic connections to one or more advertisers of the one or more advertisement listings.

The banner advertisement with the generated content is included (2107) in the web page. The banner advertisement with the generated content may be provided partially or entirely in an HTML format in the main file of the web page. The banner advertisement with the generated content may be partially provided in a file separate from the main file of the web page, which contains a reference to the separate file such that when the web page is downloaded, the separate file is also downloaded as part of the web page that is rendered as one page in the browser. When the view port of the browser is sufficiently large, the entire page can be displayed. When the view port of the browser is not sufficiently large, a portion of the entire page is displayed; and the view port can be adjust to show any portion of the page. The web page including the banner advertisement is provided (2109) as a response to the request.

Operation 2111 monitors telephonic connections made to the one or more advertisers via the contact reference information. In one embodiment, the telephonic connections are made through a server which tracks the telephone calls to determine one or more of: the number of phone calls to a particular advertiser that are generated from the advertisements, the number of phone calls to an advertiser that are generated from banner advertisements presented by a particular media channel, the durations of the phone calls, etc. The one or more advertisers for the one or more advertisement listings can be billed (2113) based on telephonic connections made to the one or more advertisers via the contact reference information, such as based on the number of calls and/or the duration of the calls.

FIG. 21 show an example of generating telephonic connections from banner advertisements. Other types of communication connections, such as video conferencing, instant messaging, common white-boarding, text/voice chatting, or a combination of different communication types, can be generated in a similar way.

Advertisement listings designed to generated two-way real-time communication connections, not just links to the web sites of the advertisers, can also be presented in other components of a web page, such as a table in a side area of a web page, or in a table on a top (bottom) area of a web page.

Further, the advertisement may be partially or entirely hidden in the web page until an element of the web page is selected. For example, an icon, a button or a hyperlink may be included in the web page; when the icon, button or hyperlink is selected (e.g., through positioning a display of a cursor over it for a period of time or activating a selection device while the cursor is displayed over it), the advertisement is displayed in a popup window (or the icon, button or hyperlink is expanded into a full version of the advertisement). The popup window of the advertisement may be dismissed after the cursor is moved away from the icon. The expanded version of the advertisement may be reversed back to a reduced version of the advertisement when the cursor is moved away from the advertisement. Alternatively, the advertisement can be presented in a separate layer of the web page; when the cursor is on the icon, button, or hyperlink, the layer including the expanded version of the advertisement is shown within the existing browser window; when the cursor is moved away from the advertisement, the expanded version of the advertisement is dismissed into the hidden layer. Alternatively, the layout of the current web page can be dynamically changed to show the expanded version of the advertisement.

Further, the expanded version of previously downloaded advertisement listings may be displayed while the current web page is being downloaded to the web browser. A version of the advertisement listings may be presented as floating over the web page (e.g., during the web page is being loaded and/or within a period of time after the web page is loaded and displayed).

FIGS. 22-25 shows further examples of displaying advertisement listings according to embodiments of the present invention.

Figure 22:
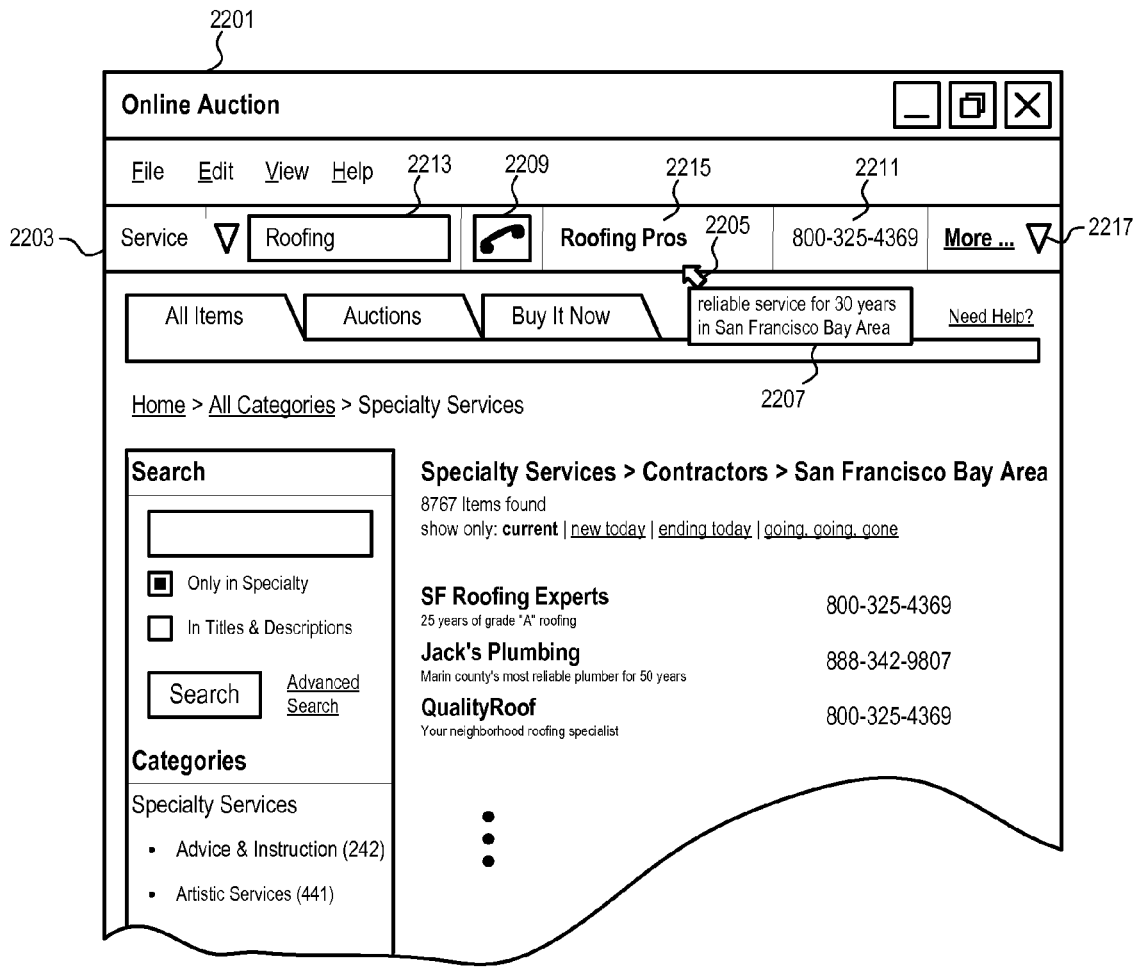
FIGS. 22-25 shows further examples of displaying advertisement listings according to embodiments of the present invention.

In FIG. 22, one or more advertisement listings can be provided in a tool bar (2203) of an application (2201), such as a browser, a contact manager, a text/graphics/program editor, a spreadsheet program, etc. The tool bar (2203) can be displayed (docked) horizontally near a top (or bottom) boundary of the application (or vertically near a left or right boundary of the application).

The tool bar may also be displayed in a separate window (e.g., floating over the main window of the application). The tool bar displayed in the separated window can be moved to the boundary of the main window and then be docked near the boundary of the main window of the application.

The tool bar (2203) can include an input area (2213) to receive one or more search terms to search for advertisement listings (e.g., based on service/product categories, geographic location, qualifications of the providers, customer ratings of the providers, etc.) In one embodiment, the tool bar can access/retrieve/read the web page, or other information in an application that is under the control of the tool bar, to determine an advertisement that is relevant to the web page or the current status of the application. For example, a tool bar on a window of an instant messaging application can select advertisements based on the instant messages that are received and displayed in the window. For example, a tool bar of an email application may display advertisements based on the current email that is being displayed.

In the example illustrated in FIG. 22, the tool bar (2203) includes an area (2209) to display an icon (2209) which indicates the current availability of advertiser (e.g., a service/product provider) to talk over a telephonic connection. The icon (2209) can be selected through positioning a display of a cursor over the icon using a cursor positioning device, such as a mouse, a touch pad or a joystick, and activating a signaling device, such as a button of the mouse, the touch pad or joystick or a key on a keyboard or a predefined input event from the touch pad such as a tap or double-tap on the touch pad, while the cursor is displayed over the icon (2209). The icon (2209) may also be selected by pressing one or more keys of a keyboard (e.g., in a predetermined combination and/or sequence). When the icon (2209) is selected, the tool bar (2203) initiates a request for the telephone connection to the corresponding advertiser. The telephone connection may be initiated from the computer/device that runs the application (2201) (e.g., through an embedded VoIP communication module, or a separate VoIP application).

Alternatively, the tool bar (2203) may cause the request to be transmitted to a connection system (e.g., a server remote from the computer/device that runs the application (2201)) which initiates the telephone connection based on a reference to the advertisement list. In response to the request, the connection system may further request a telephonic contact of the user of the application (2201), such as a telephone number of a landline phone or a cellular phone, or a user identification of a VoIP system. Alternatively, the telephonic contact information may be stored (e.g., as a preference or configuration option of the tool bar or the application) and transmitted to the connection system with the request. Alternatively, the telephonic contact information may be pre-stored on a database accessible to the connection system, which retrieves the contact information based on an identification of the user of the application (2201).

In FIG. 22, the tool bar also displays the phone number (2211) assigned to the advertiser. In one embodiment, when the phone number (2211) is called, the call is connected to a connection system first. The connection system identifies the advertiser based on the phone number dialed to reach the connection system and/or an extension dialed after the call reaches the connection system. The connection system then further connects the call to the advertiser (e.g., through dialing a separate call to the advertiser and joining the calls to connect the caller to the advertiser or forwarding the call to the advertiser).

In FIG. 22, the tool bar provides an area (2215) to display an identification of the advertiser, which may include one or more of: the name of the advertiser, a logo or icon or photo picture of the advertiser, a short description, etc. When the cursor (2205) is positioned over the area (2205) for a predetermined period of time (and/or selected through activating a signaling device), a popup window (2207) is shown to provide further details about the advertiser. The popup window may automatically disappear after a predetermined period of display, or be dismissed after the cursor (2205) leaves the area (2215) or be dismissed through selecting the popup window. Alternatively, a layer of advertisement, or advertisement information presented on top of the current web page or application can be presented without spawning a new window.

In FIG. 22, the tool bar (2203) further includes an element (2217) which can be selected to request the display of other advertisement listings that are retrieved as a result of the search.

In one embodiment, the tool bar (2203) may perform a search automatically based on the content that is currently loaded into the application (2201). The search may be performed in a background process (e.g., using the idle network connection when the CPU usage is low) such that the performance of the application (2201) is not affected. The automatic search allows the user to see advertisements listings that are in the similar area of the content currently displayed to the user of the application (2201).

Figure 23:
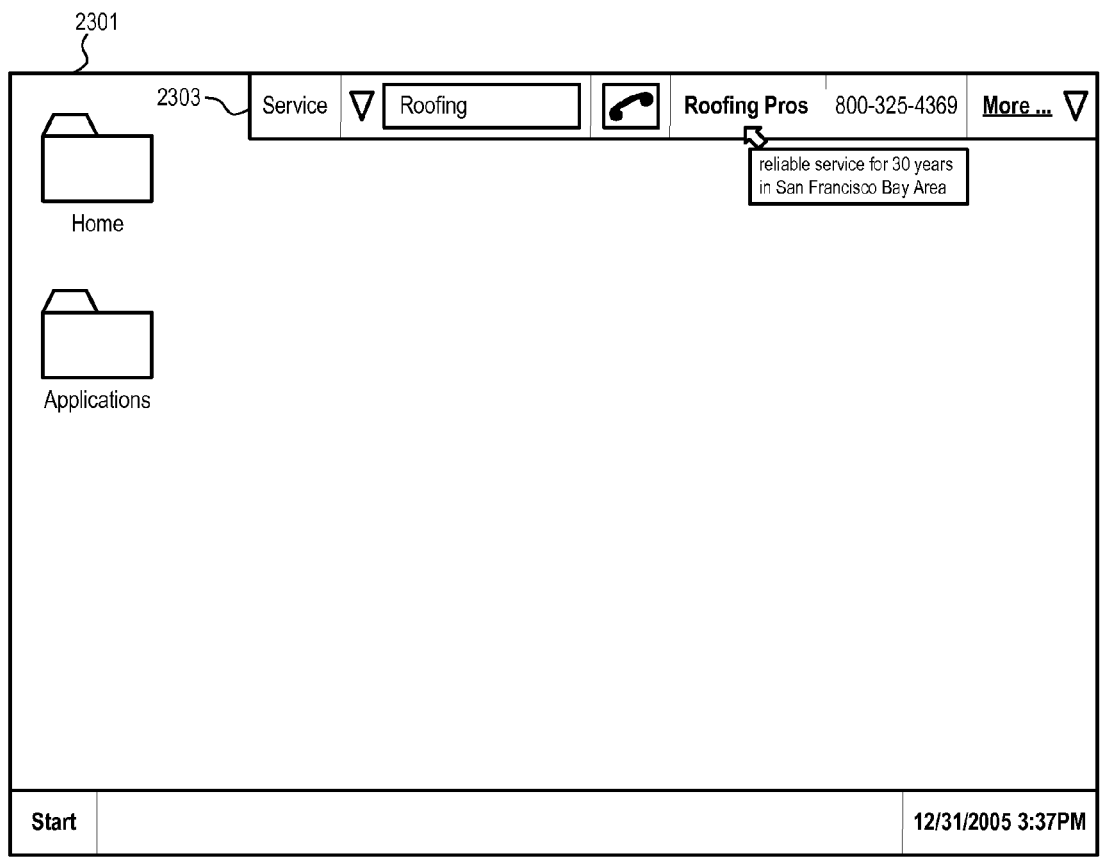
Figure 24:
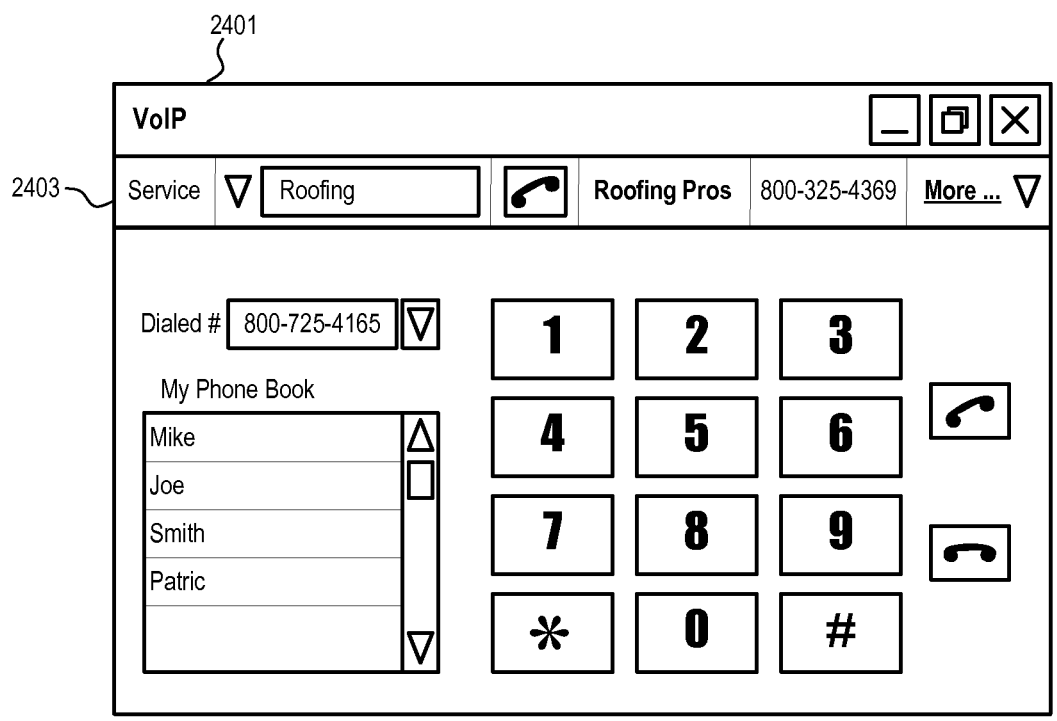
Figure 25:
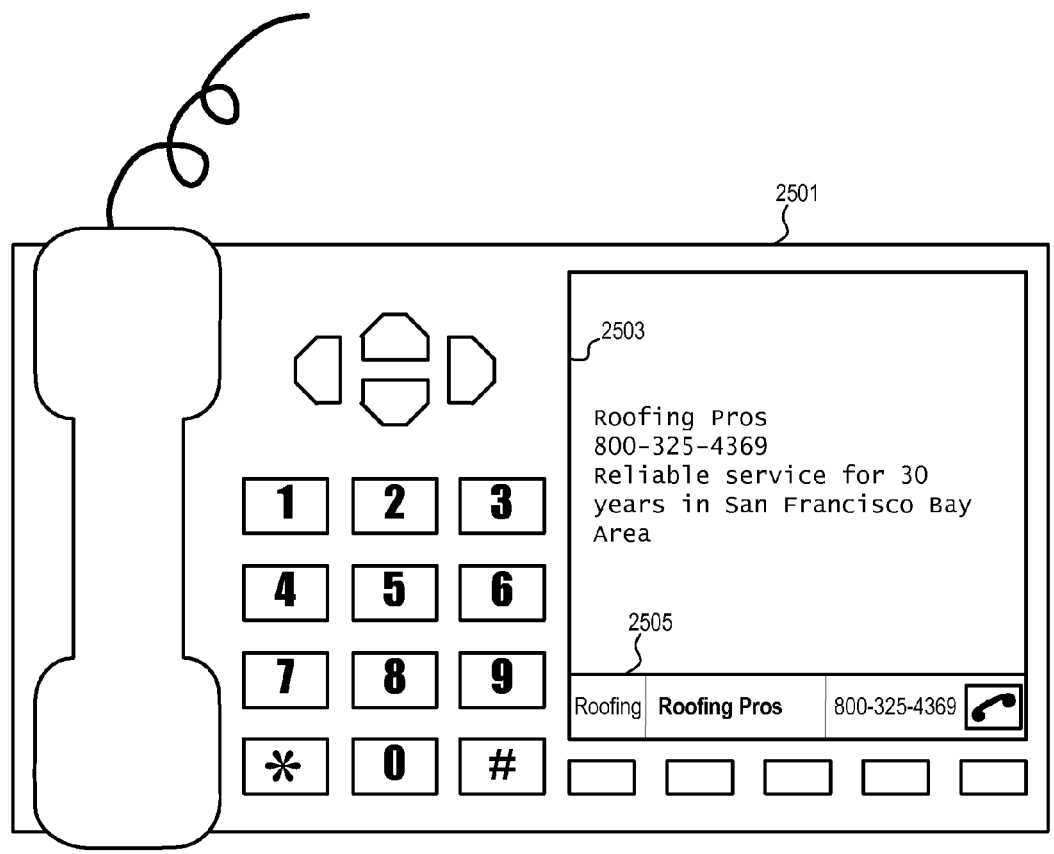

In one embodiment, a tool bar may not be associated with a particular application. As illustrated in FIG. 23, a tool bar (2303) may be docked to a boundary of the desktop (2301) of the graphical user interface. The tool bar may be relocated to different part of the boundary of the desktop (2301) or be moved to float over the desktop.

In one embodiment, a tool bar (2403) is provided in a VoIP application (2401). A user of the VoIP application can use the application to initiate and/or receive telephone calls via a VoIP system, and thus, the VoIP application (2401) can be considered as a VoIP user terminal.

In one embodiment, the display of advertisement listings is provided on a telephone set (2501) which has data communication capability. For example, the telephone set (2501) may support VoIP; a user of the telephone set (2501) can use it to initiate and/or receive telephone calls via a VoIP system, and thus, the telephone set (2501) can be considered as a VoIP user terminal.

The telephone set (2501) has a display device (2503) which can be used display an advertisement listing (2505). The advertisement listing (2505) may be displayed based on a search formed according to input received at the telephone set (2501) through the key pad of the telephone set. Alternatively, the search request may be provided to a remote system, via voice or via the key pad, over a telephonic connection after dialing a phone number of the remote system. The search result obtained at the remote system is provided to the telephone set (2501) for display. Alternatively, the search may be formed automatically on the telephone set (2501) based on one or more telephone numbers dialed by the user; the search is formed to find providers similar to the phone numbers dialed. For example, the telephone set (2501) may submits the one or more telephone numbers dialed by the user to the remote system to search for advertisers who provide services and/or products in the same category of the callees of the telephone numbers dialed. Thus, the user has the opportunity to dial the advertisers of the listings (e.g., if the call to the dialed telephone numbers is not answered, or the previous call does not provide results to the satisfaction of the user of the telephone set (2501)).

Further, the advertisement listings paid by advertisers according to the establishment of real-time communication connections can also be presented in other types of media channels, such as newspapers, magazines, displayed surfaces of items that have a surface designed to be attached to another surface (such as refrigerator magnets, posters, or stickers), television programs (e.g., interactive TV, cable TV, satellite TV, or web TV), radio programs, billboards, etc. When the media channel is not real-time or interactive, a reference for make a real-time communication connection to a connection system (e.g., a telephone number, an internet address, VoIP ID, etc.) can be provided to request the connection system to connection real-time communication through to the advertiser (e.g., through identifying the advertiser based on the reference used to connect to the connection system).

In one embodiment, business listings are placed on a map as advertisements to promote the businesses and improve accessibility of the business. In one embodiment, the advertisements are charged for on a per call basis, when the customers call for real-time communication sessions with the advertisers in response to the advertisements. For example, the customers may make phone calls to the advertisers; and the advertisements are charged for based on the number of phone calls generated from the advertisement. In one embodiment, an advertisement (or business listing) includes a reference for real-time communication, such as a telephone number that is used to receive calls from customers such that the calls from the customers as a response to the advertisement can be tracked and further connected to the phone number of the business. In one embodiment, a business entity can specify a price bid for a phone lead received from the advertisement; and advertising efforts can be prioritized based at least in part on the price bids specified by the business entities. The reference for real-time communication can be a VoIP ID, a text chat ID, a video chat ID, or a plain old telephone number that can be dialed on a plain old telephone system (POTS) for a phone connection over a public switch telephone network (PSTN). In one embodiment, the reference is used to receive, at a service provider, customer calls for a real-time communication session (or requests for connections for real-time communication) and to track the communication leads delivered to the business entity. In another embodiment, the reference can be a code, embedded in an icon or logo which when selected generates a request for a connection for real-time communication. For example, the reference can be a click-to-call reference.

Figure 26:
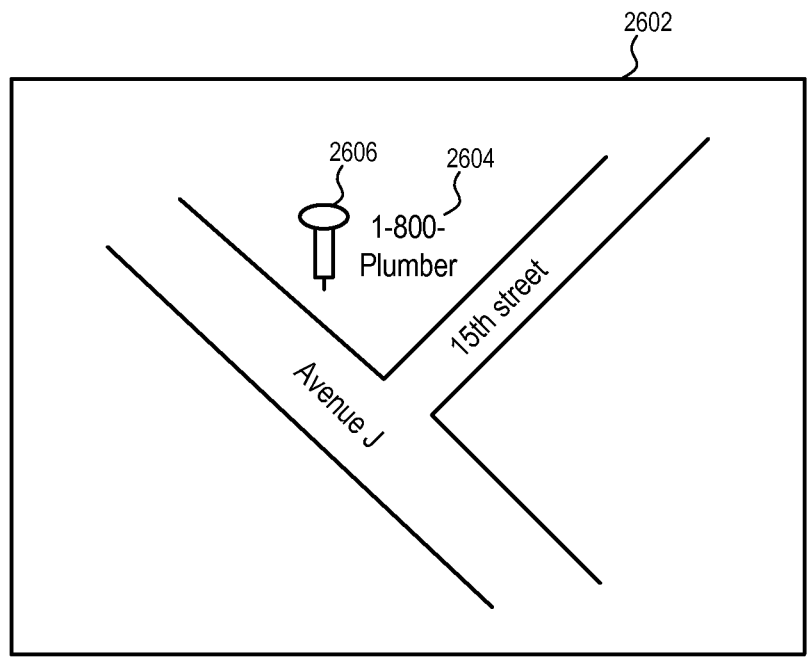
FIGS. 26-28 illustrate examples of displaying an advertisement for a business on a map based on a location of the business, according to one embodiment.
Figure 27:
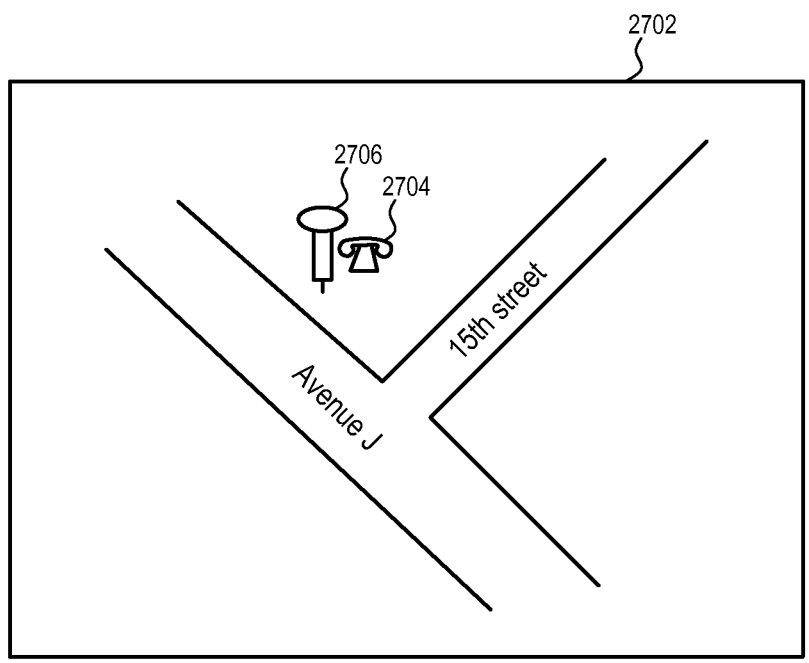
Figure 28:
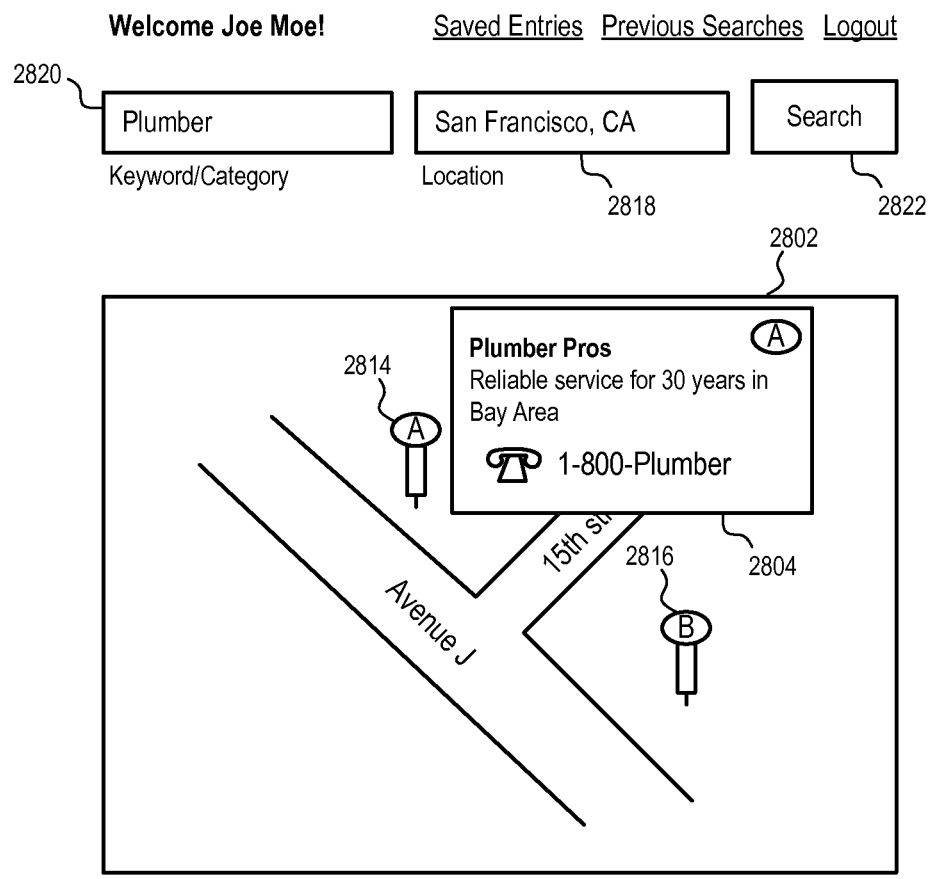

FIGS. 26-28 illustrate examples of displaying an advertisement for a business on a map based on a location of the business, according to one embodiment.

In FIG. 26, a telephone number 2604 (e.g., "1-800-Plumber") advertised for a business is displayed on a map 2602 in the vicinity of the location of the business on the map 2602. When the telephone number 2604 is dialed, the call is connected to a connection provider, which looks up a phone number of business based on the telephone number dialed and then further connects the call to the business. Alternatively, the phone number may include an encoded/encrypted version of the telephone number of the business (e.g., as an extension); and the connection provider can decode/decrypt it to obtain the telephone number of the business without relying upon a database. In one embodiment, the phone number can be dialed on a Plain Old Telephone System (POTS); in one embodiment, the phone number includes a SIP address.

In one embodiment, the icon 2606 is displayed at on the map 2602 on an interactive media (e.g., a web page, an interactive TV program, a map console, etc.) to represent the location of the business; and the icon 2606 is selectable to request a display of further details of the advertisement on a popup window, or on a layer on top of the map, or in a separate display area.

In one embodiment, the map 2602 is displayed on a device that has the capability to dial a phone call, such as a cellular phone, a networked computer having access to a VoIP phone service, a computer equipped with a modem connected to a phone line, a wireless phone, a cordless phone, etc. The phone number 2604 is presented on the map 2602 in a format; and when the phone number 2604 is select, the device dials a call to the phone number 2604 for the user.

In one embodiment, the phone number 2604 is selectable to show a menu for different operations on the phone number, such as dialing the phone number 2604, adding the phone number into a contact book, sending the phone number to a mobile phone via SMS (or email or instant message), requesting a callback for a phone connection to the phone number, etc. Alternatively, the phone number 2604 is user configurable to perform one of the above discussed operations, when the phone number 2604 is selected, without showing the list of options. In one embodiment, the icon 2606 is configured to be selectable to show the menu options, or to perform the user configured operation. In one embodiment, after the user selects a type of operations from the menu options, subsequent selections of similar icons or phone numbers cause the device to perform the same type of operations without further presenting the list of options.

Alternatively, the map 2602 may be displayed on a non-interactive media, such as newspaper, magazine, billboard, etc. A user may manually dial the phone number 2604 that is displayed on the map. When the phone number 2604 is dialed, the phone call is connected to a connection provider for tracking and for further connection to the business.

In one embodiment, the icon 2606 in the shape of the pin can be used to access additional information about the business as well as to retrieve alternate references for real-time communication (e.g., a chat ID). Alternatively, the icon 2606 can be in the shape of a phone, a button, a logo, tradename, trademark name, or a representation of a product of the business, or a logo of a category of businesses.

In FIG. 27, an icon 2704 is displayed on a map 2702 in the vicinity of another icon 2706 which is displayed to indicate the location of the business on the map 2702. Alternatively, the icon 2704 can displayed on a map 2702 to indication the location of the business without the pin-shaped icon 2706.

In FIG. 27, the icon 2704 is selectable to dial the phone number of the business (e.g., "1-800-plumber"), or to make a VoIP call to the phone number of the business, or to request a callback for a phone connection to the phone number of the business, or to send the phone number of the business to a mobile phone of the user via SMS, email, or instant message. In one embodiment, the operation performed when the icon 2704 is selected is customizable by a user of the map (or the user of the device that displays the map).

In one embodiment, in response to the user first selecting the icon 2704, the phone number (e.g., "1-800-plumber") is assigned, provided to the user device, and dialed. Thus, the phone number embedded in the icon 2704 is assigned on-demand, when the phone number is ready to be dialed (or transmitted to a mobile phone via an SMS, email, or instant message). In one embodiment, the specific action of the user on the phone number is used as a measurement of the performance of the advertisement, based on which the advertisement is charged for.

In one embodiment, communications (e.g., text, voice and/or video chat sessions) initiated through a provided reference (e.g., telephone number, chat ID, VoIP ID, a click-to-call reference, etc.) are monitored for quantitative usage; and the advertisement for the business can be billed on a per call basis, or based on a count of calls. A call may be a telephone call, a request for a session for real time communication, a call for a connection for real time communication, etc. In one embodiment, quantitative usage of the reference, such as distinct calls generated from an advertisement using the reference, is monitored for billing purposes.

In one embodiment, the icon in the shape of the pin 2706 can be used to access further information about the business, such as a brief description, a detailed description, electronic coupon, a link to the web site of the business, etc., as well as to retrieve alternate references for real-time communication (e.g., a chat ID).

In FIG. 28, an advertisement window 2804 is displayed on a map 2802 near an icon 2814 that indicates the location of the business on the map 2802. A further icon 2816 is displayed on the map 2802 to indicate the location of another business on the map 2802.

In one embodiment, the icons that represent the location of the businesses (e.g., 2814 and 2816) can be selected to display a version of the advertisements for the business in the advertisement window 2804. The advertisement window 2804 may be implemented as a popup window, or a separate layer on top of the map 2802.

In one embodiment, the position of the advertisement window 2804 is adjustable by the user of the map 2802. For example, the user can drag the window on the map 2802 to a desired location. Alternatively, the location of the window is computed based on the location of the business on the map. In one embodiment, an initial location of the window is computed by the system based on the location of the business on the map; and the user can subsequently move the window to a desired location.

Alternatively, a separate advertisement window can be displayed when the icon representing a separate business on the map is selected.

In FIG. 28, a business promotional message is displayed in the advertisement window 2804 on the map 2802, in response to a search request submitted by the user (e.g., on a webpage). For example, the user can provide a keyword, or a category of product/service, in the entry box 2820 and an indication of the location of the desired business in the entry box 2818 and then select the button 2822 to request a search. Alternatively, the system may automatically limit the search with the geographic region shown on the map 2802.

In one embodiment, the search results are sorted based on the price bids of the businesses for communication leads; and the icons (e.g., 2814, 2816) that represent the businesses are indexed sequentially (e.g., A, B, ... ) according to the position of the advertisements in the sorted list.

In one embodiment, the advertisement for a business that is on the top of the list is displayed automatically in the advertisement window 2804, when the search result is presented; and the user may further select the icons for other businesses to view the details of the corresponding advertisements. Alternatively, the first advertisement is displayed on the map 2802 after the user selects an icon that represents the particular business.

In FIG. 28, the advertisement window 2804 shows the name of the business, a brief advertisement message, an icon and a phone number that is assigned to the business for the tracking of phone calls generated from the advertisement. Alternatively, more or less items may be displayed. For example, the brief advertisement message may not be displayed; and a link or icon may be further displayed for the request of further advertisement details.

In FIG. 28, the icon and/or the phone number in the advertisement window 2804 can be presented in a selectable format. When the icon/phone number is selected, an operation is performed on the phone number for the user, according to a user preference, a pre-determined configuration parameter, a configuration parameter determined based on the capability of the user device, an operation previously selected by the user, etc. For example, the phone number may be dialed for the user, or be sent a mobile phone of the user via an SMS message; or a request for a callback to a phone of the user for a phone connection to the phone number is generated.

In FIG. 28, the user is registered and logged into a server to use the service. The server is configured to maintain user preferences and device capabilities for the customization of the interface (e.g., the phone number and the icon within the advertisement widow 2804, the size of the advertisement, and the font used for the advertisement message). For example, the server allows users to log into their accounts to save search results for access at a later time. Alternatively, user authentication may be not required; and the customization may be based on the hardware and/or software capability attributes that can be determined based on communications between the user device and the server.

In one embodiment, the advertisement window 2804 is located on the map at the location of the business; and it may be movable (e.g., drag-able) to other regions of the map or placed outside of the map 2802, or partially on the map and partially outside the map 2802.

In other embodiments, the map 2802 and the advertisement window 2804 can be displayed on non web-generated media, non web-enabled device, and/or non web-clients such as television programs, newspaper media, video games, and/or static billboards or electronic billboards, etc.

In FIG. 28, the advertisements are displayed as a result of a keyword and location based search. Generally, at least one advertisement containing an assigned telephone number (e.g., a reference for real-time communication) can be obtained based on a keyword search, category search, location-based search, location-based keyword search, etc. The location of the search may be obtained based on a measurement using a GPS receiver, a mobile phone position determination system, and/or the map. For example, a keyword search may be used to obtain vendor information for a specific services and/or products; a location may be used to limit the search results to a certain geographic area (e.g., a city, a state, an area that is a radius within a particular address or zip code); and in one embodiment, the searches are based on a GPS measurement to automatically produce search results that are relevant to the current location of the requesting device.

In one embodiment, the geographic area of the search is limited to the area that is shown in the current map 2802 on the user interface. When the user adjusts the map (e.g., through zooming, panning, and/or rotating) to show different geographic areas, the search is updated to show relevant business in the geographic area that is depicted in the current map 2802. In one embodiment, a GPS receiver is integrated with the mobile device on which the map is displayed; and the map is automatically updated according to the measurement obtained from the GPS receiver.

In FIG. 28, the search results are also displayed in an area 2830 that is outside of the map 2802. In one embodiment, a detailed version of the advertisement is displayed in the area 2830 that is outside the map 2802; and an brief version of the advertisement is displayed inside the advertisement window 2804. More or less items from the information displayed in area 2830 can also be selectively configured for display in the advertisement window 2804.

In FIG. 28, the search results displayed in the area 2830 includes the address of the business ("100 Avenue J, San Francisco, Calif."), a telephone ID ("1-800-Plumber") which is a reference for requesting a real-time duplex phone communication session with the business, and a chat ID ("PlumberProsforYou") which is a reference for requesting a real-time chat session with the business (e.g., via text, voice, image and/or video).

In one embodiment, the search result displayed in the area 2830 is automatically displayed (partially or wholly); alternatively, the search result may be displayed (and/or expanded) based on a selection (e.g., a click) of an icon that represents the business on the map (e.g., 2814).

In one embodiment, other references for communication with the business can be displayed (e.g., in the form of icons) to show additional modes available for communicating with the business, such as text-based chat, video-based chat, VoIP call, email, SMS instant message, etc. For example, the icons (e.g., 2808, 2806, 2810, 2812, etc.) are selectable (e.g., clickable) to initiate a communication session with the business. The communication between the business and the customer may be in real time (e.g., when an instant messaging session or a phone call is used), or not in real time (e.g., when email or SMS is used). In one embodiment, the advertisement is charged for in response to each communication session facilitated via the references presented in the advertisement.

In one embodiment, for example, when a cursor is positioned over the icon 2816 in the map, an advertisement showing a reference for real-time communication for the business represented by the icon 2816 is displayed in the advertisement window 2804 (with or without adjusting the position of the window 2804) or in a separate window near the icon 2816 (with or without closing the advertisement window 2804). In one embodiment, when the icon 2816 is selected (e.g., clicked), the detailed advertisement for the business represented by the icon 2816 is displayed (e.g., in the area 2830). In general, the detailed advertisement can be displayed either on the map and/or outside of the map.

In one embodiment, the system determines the number of advertisements and/or the level of details of the advertisements that are presented on the map based on the display characteristics of the client device, such as the screen size and/or available fonts. For example, the system may determine a mobile computing device is requesting the information, and further identify that the mobile computing device has a display of limited size relative to a display of a desk top computer. As a result, the system would provide a smaller advertisement or listing, or provide less to be displayed, in accordance with the smaller display of the mobile device.

In one embodiment, the system determines the size of the window (e.g., 2804 in FIG. 28), based on the size of the map and/or the size of the display device, to show the listing of an advertisement. For example, when the system determines that the display device is a mobile device, such as a cellular phone or a smart phone which has a limited screen size and/or processing power, the system may presented a smaller window. A server system may determine the size of the window or the display of the client device based on a client application running on the client device, based on an identifier of the client device, or based on a communication protocol used by the client device. Based on a request sent from the client device, the server system can determine or estimate a size of the display device and then determine how to present the advertisements on the map. Alternatively, how the advertisements are displayed on the map can be dynamically determined by a client software running on the client device.

In one embodiment, when a number of advertisements matches a search request, the advertisements are sorted according to relevancy, price bids for communication leads, and/or other criteria, such as expected yields from advertisements generated from the presentation of the advertisements. A top ranked subset is selected for presentation within the map. In one embodiment, as illustrated in FIG. 28, to avoid obscuring the map, a top ranked advertisement is provided in a relatively larger size on the map (e.g., via window 2804), while other advertisements are presented on the map in a smaller size (e.g., via icons 2816). Alternatively, more than one top ranked advertisement is presented in a larger size, depending on the size of the map and/or the locations of the businesses of the top ranked advertisements in the map. In one embodiment, none of the presented advertisements are shown in the large size, until one of the small size advertisements is selected.

In one embodiment, the advertisement presented over the map can be selected (e.g., the advertisement as presented in the window 2804, or the advertisement as represented by the pin 2814 or 2816 in FIG. 28) to show a full size advertisement. The full size advertisement may be presented in a pop-up window or a layer separate from the map (e.g., 2802). Alternatively, the full size advertisement will replace the web page contain the map. Alternatively, the advertisement presented over the map contains link which when selected leads the browser to a separate web page that contains the full size advertisement. In one embodiment, the full size advertisement can be a landing page of the advertisement, showing the brief description, an optional detailed description, available options to contact the advertiser, electronic coupons, a logo or photo picture of the business, special offers, and/or optional links to the web pages of the business, etc. In one embodiment, the window (2804) is presented as a pop-up window or in a separate layer; and when the window (2804) is selected, the window (2804) is enlarged to show a full version of the advertisement (e.g., a landing page of the advertisement); and the enlarged window can be reduced back to the original size to show a reduced version of the advertisement when further selected.

In one embodiment, the level of details that are presented for an advertisement is selected based on the size of the map and/or the size of the display device. For example, as illustrated in FIG. 28, when the size of the window (2804) is large, a detailed listing can be presented within the window (2804), which may include a brief description, a phone number and the name of the business. When the size of the window (2804) is small, a less detailed listing can be presented, which may not include, for example, a brief description.

In FIG. 28, when the 'CALL' icon 2808 is selected, a phone conversation is initiated with the business via a connection provider. In one embodiment, whether the 'CALL' icon is displayed is based on the calling capabilities of the device. For example, the 'CALL' icon can be displayed on a VoIP-enabled device; and when the 'CALL' icon is selected, a VoIP client is automatically launched and used to call the business via the connection provider. Alternative, the 'CALL' icon may be used to initiate a callback by the connection provider to a phone number of the user to provide a phone connection to the business. Alternatively, the 'CALL' icon can be selected to cause the user device to dial the phone number "1-800-Plumber" for a call to the connection provider, which upon receiving the call further connects the call to the business based on the dialed number "1-800-Plumber".

In FIG. 28, the 'CHAT' icon 2806, when selected, can initiate a real-time text-based chat session with representative of the business via a connection provider in a way similar to the initiation of a phone connection.

In one embodiment, a chat session connection is provided through an instant messaging client residing on the requesting device. A prompt to install an instant messaging client can be instantiated in the case no instant messaging client was found on the requesting device.

In one embodiment, an 'SMS' icon, or an 'EMAIL' icon, can be used to provide the business promotional message and/or the phone number "1-800-Plumber" to a portable device of the user. In another embodiment, an SMS or email message can be used to request a connection with the business. For example, a call back from the connection provider or the business can be requested via a web request, an SMS message or an email message. The advertisements can be billed to the business in response to the communication leads provided to the business, in a similar manner as the phone leads. In one embodiment, the SMS identifier and/or the email identifier are assigned such that the communications directed to the business using the assigned identifiers can be tracked.

In one embodiment, references of real-time communication (e.g., phone numbers assigned to businesses for tracking the responses to advertisements presented for the businesses) are displayed based on the current location of the requesting device. For example, a requesting device that is GPS-enabled may be provided with relevant businesses of interest in the vicinity of the location of the requesting device for display on a map based on results of a search and/or user indicated preferences. The search may be performed automatically in response to a location determination of the mobile device, or in response to a search request from the user. For example, the references may be displayed based on a search for "pizza within 10 miles", or "pizza" within the area currently displayed on the map. References may also be automatically provided based on a user specified setting such as "show me information about a movie theater whenever I am within its 1 mile radius". In a further embodiment, an interactive document including the map having the reference of real-time communication can be generated based on the current location of the requesting device. For example, the map and the references located thereon can be continuously updated based on the current location of the requesting device. The map can move according to the current location of the requesting device (e.g., centering the map according to the current location of the device in the map); and the references with closest proximity to the requesting device can be selectively displayed.

In requesting devices that are not GPS-enabled, the current location of the requesting device can be determined via a user selecting a point on the map, or via an alternative positing determination system, such as a position determination system for cellular phones.

In one embodiment, a reference for real-time communication with a business (e.g., an assigned telephone number) is provided to be placed in a representation of the geographical region according to a location of the business in the geographical region. The reference for real-time communication with a business may be placed in one of the media channels for display on a software client and/or a device showing a representation of a geographical region such as a street map.

Figure 29:
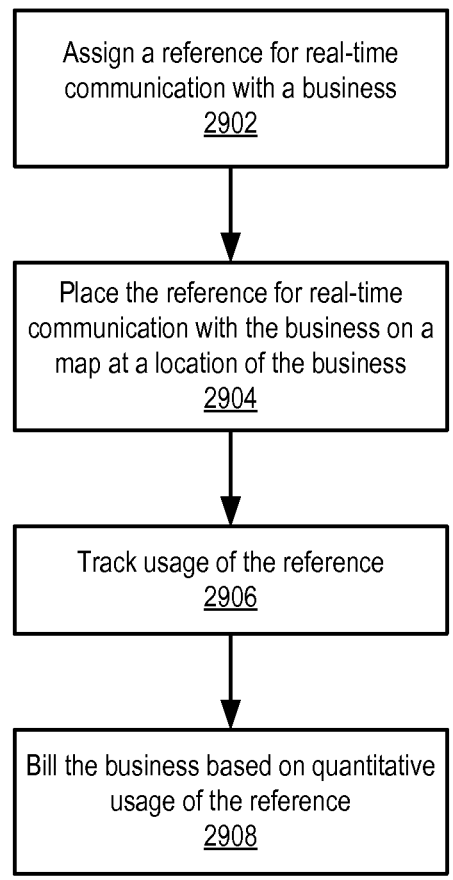
FIG. 29 is a flow chart illustrating providing a reference on a map for real-time communication with a business, according to one embodiment.

FIG. 29 is a flow chart illustrating providing a reference on a map for real-time communication with a business, according to one embodiment. In process 2902, a reference for real-time communication with a business is assigned. The reference is assigned such that when a real-time communication connection is requested via the reference, the business and/or the media channel responsible for delivering the reference to the customer can be identified. In process 2904, the reference for real-time communication is placed on a map at a location within the map corresponding to the location of the business. Then, in process 2906, usage of the reference is tracked; and in process 2908, the business is billed based on quantitative usage of the reference.

In one embodiment, usage of the reference includes establishing a connection for real-time communication with the business (e.g., a phone conversation, a voice chat, a text chat, and/or a video chat). The usage is tracked to bill the business based on quantitative usage of the reference.

The reference can be placed on a map displayed on, but not limited to, a VoIP client, a wireless phone, a Bluetooth phone, a Universal Serial Bus (USB) phone, a Personal Digital Assistant (PDA), a computing device, a handheld computing device, a portable device, a telephone, and/or a GPS unit. The reference can be provided through one or more of a broadcasting media, a television media, a radio media, a web interface, Wireless Application Protocol (WAP), short message service (SMS), and instant messaging for display on any of the devices previous mentioned, or be provided through a printed media.

In one embodiment, the geographical representation is used to depict a portion of the earth's surface; and the geographical representation may include a diagrammatic map, a street map, a virtual map, a satellite transmitted depiction, a photographic depiction, a video depiction, an audio description, a survey, an atlas, a contour map, a 2D representation of landmarks, a 2D representation of geographical features, a 2D representation of structures, a 3D representation of structures, and/or a 3D representation of any of the above.

In one embodiment, a business promotional message (e.g., advertisement) including a reference for real-time communication can be placed at a location on the geographical representation that corresponds to a location of the business. In addition to the reference, the business promotional message may further include a name of the business, a brief description, an icon/logo of the business, and/or a coupon offer, etc. The business promotional message can be displayed on the map, or partially on the map and partially outside the map. The reference of real-time communication can be displayed in textual form and/or in graphical form (e.g., logo, icon, etc.).

In one embodiment, the extent to which the business promotional message is displayed on the map can be automatically adjusted and/or manually selected. On an electronic device, the amount of advertisement data displayed on the map can be formatted according to the screen size of the requesting device. The remaining portion of the business promotional message and/or references to alternate forms of communication with the business can be displayed outside of the map.

Examples of references for real-time communication with the businesses include but are not limited to, a telephone number, a toll free telephone number, a local number, a vanity number, a number without an extension, a number with an extension, a click-to-call reference, a reference to request a connection via callback, a click-to-reveal reference, a VoIP identifier, an online chat identifier, a Session Initiation Protocol (SIP) address, and a universal resource identifier (URI).

References for real-time communication with a business can be assigned in a variety of ways. In one embodiment, one phone number may be assigned to a number of businesses. When the phone number is dialed, the call is received at a connection provider and further routed to a specific business (e.g., based on the location of the caller, the time of the call, an indication of a product or service category, an extension assigned to the specific business, or a user request). In one embodiment, the user request may be received via an operator, an interactive voice response (IVR) system, or via a separate text channel established in relation with the call. In one embodiment, the business is billed when the connection between the customer and the business is readily available to the business. For example, when the call is ready to be answered by the business, such as a predetermined time period after the phone of the business rings while the customer is on the line, the business can be charge for the phone lead.

In one embodiment, a telephone number may be assigned to the business or a group of businesses (e.g., a group of business of a particular industry/services/category, etc.). When a unique number is assigned to the business, the number can be monitored to bill the business. When a unique number is assigned to a group of businesses in a particular industry, another identifier, such as an extension number, can be assigned to the businesses within the group. Alternatively, the calls to the unique number for the particular industry can be routed to an operator (e.g., a person, a voice-recognizing machine, and/or a computing device) where the call can be further directed to a particular business based on information provided by the caller.

In one embodiment, the unique number can be assigned on the fly based on a request to reduce the need for unique numbers for tracking of calls. In another embodiment, an original telephone number of the business may be encoded (with or without encryption) before presenting it to a user (e.g., as an extension). Thus, a database is not require for the determination of the original telephone number of the business. When the encoded number is dialed, the encoded number is decoded to provide the original number; and the call can be tracked and routed via decoding/decrypting the dialed number.

In one embodiment, a code (e.g., alpha-numerical, symbolic, etc.) can be assigned to the business and the code is entered to establish communication with the business. For example, the code may be a URI that when accessed from a browser, causes the browser to display a webpage. The webpage may include integrated chat clients, and/or VoIP clients such that communication can be established with the business. The code can also be used after a phone number is dialed to identify the business for routing purposes. The code can be entered in text form, and/or spoken to an operator (e.g., person, voice recognizing machine, and/or a computing device, etc.) to be routed to the business.

In one embodiment, businesses are billed based on quantitative usage of the reference, such as a count of calls generated from the advertisement. Alternatively, the business may be charged for the advertisement based on an indicator determined based on how frequently the business is called, how frequency the business is called by a same originating number, duration of each call, average duration of calls, number of unanswered calls, and/or number of calls placed on hold.

In one embodiment, the presentation of the assigned reference in the map depend on user specified preference, user profile, screen size, and/or capabilities of the requesting device. For example, when a requesting device has telephonic capabilities but no instant messaging capabilities, a telephone number is displayed without showing a chat ID; and the telephone number can be presented in a way to allow the device to dial the number without the user manually dial the digits of the phone number.

For example, based on knowledge of the screen size of the requesting device, which may be manually specified or automatically detected, references to communicate can be displayed a selected size to enhance readability. For example, on a portable device having a small screen, an iconic form of the reference may be displayed to enhance readability such that other elements on the map are not obstructed; the iconic form can be selected to cause the display of a textual form of the reference in the vicinity of the icon (or elsewhere on the map, webpage, or display screen). In one embodiment, the textual form of the reference is automatically displayed at a region outside a map whenever the iconic form is displayed on the map.

In one embodiment, the reference displayed is selectable and when selected, initiates a communication session with the business. For example, when displaying a telephone number on a device with telephonic capabilities (e.g., telephone, wireless telephone, cell phone, smart phone, PDA, BlackBerry, VoIP-enabled client, etc.), a telephone number displayed in a selectable format. When the telephone number is selected on the device, the telephone number is dialed by the device. For example, a chat ID may be displayed and manually entered into an instant messaging client to initiate the real-time communication session with the business; or the chat ID may be presented in a selectable format, which when selected, causes the chat ID assigned to the business to be entered into an instant messaging client. The instant messaging client can also be manually initiated or automatically initiated based on user interaction (e.g., selection) with the reference and/or an icon of the reference.

In one embodiment, real-time communication sessions with the business can be carried out in a window that is integrated in the map, in a window that is in a region next to a map, in a different window, in a pop-up window, and/or in a window that is integrated with a browser.

For example, a window for an instant messaging session may be integrated to a map at the location of the business. The window may also be a pop-up window at the location of the business on the map, or be automatically displayed and/or manually placed on a side of the map. A window can also be displayed in a similar fashion for other forms of communication, such as VoIP sessions and video chat sessions. In one embodiment, a communication module is designed to handle such requests and/or automatically make suitable adjustments based on attributes of the requesting device, such as screen size, to enhance readability.

Figure 30:
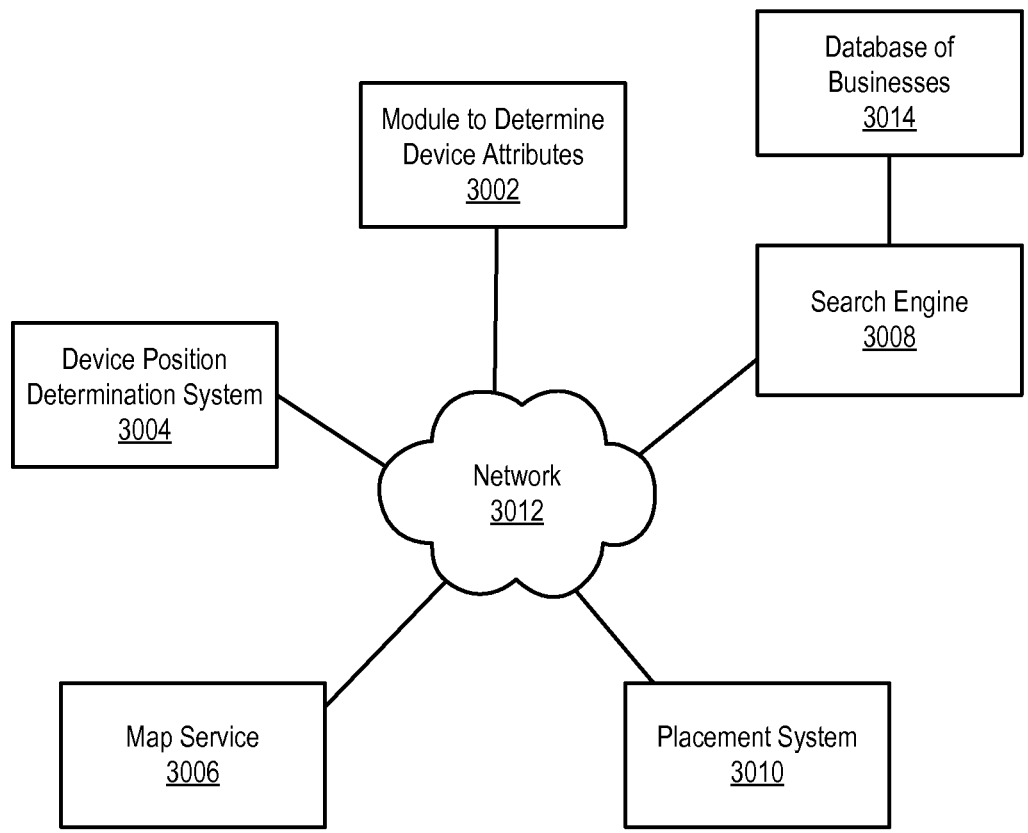
FIG. 30 shows a block diagram of a portion of a system to implement at least some embodiments.

FIG. 30 shows a block diagram of a portion of a system to implement at least some embodiments. Referring to FIG. 30, the system includes a module 3002 to determine device attributes, a device position determination system 3004, a map service 3006, a search engine 3008, and a placement system 3010, communicating with one another through a network 3012, according to one embodiment. In alternate embodiments, additional, less, or different modules can be included in the system; and some of the modules may be configured on a same data processing system to avoid communications over a network connection.

In FIG. 30, the search engine 3008 can be used to search a database of businesses 3014, based on criteria such as geographical location, hours of operation, type of industry, and/or available forms of communication, etc. The placement system 3010 determines the placement of the advertisements for the businesses on a map provided by the map service 3006.

In one embodiment, the map is generated by the map service 3006 based at least in part on the current location of the requesting device. For example, the device position determination system 3004 can be used to determine the current location of the requesting device (e.g., via a GPS system, a cellular phone position determination system, an user input on the map, etc). In one embodiment, the device position determination system 3004 tracks the current location of the requesting device; and the mapping service 3006 updates the displayed map based on the current location of the requesting device. In one embodiment, the search engine 3008 is configured to provide search results in vicinity of the current location of the requesting device.

In one embodiment, location specific references and maps are provided based on a zip code, an area code, an estimated location of a cellular phone (e.g., based on the position of the base-station in communication with the cellular phone, etc.), or a GPS position. A zip code can be manually entered during a search session by a user, or be automatically retrieved from the user account that is registered with the requesting device. An area code may be entered manually, or be automatically determined from user account information (e.g., caller ID, ANI).

In another embodiment, the mapping service 3006 is configured to provide a map that shows a geographic region covering a set of businesses in the search result returned from the search engine 3008.

In FIG. 30, the module 3002 can determine the relevant hardware and/or software attributes of the requesting device for the customization of advertisement presentation on the requesting device. For example, the module 3002 may detect the screen size of the requesting device to improve the display of the references of real-time communication on the map. For example, when the module 3002 determines that the requesting device has a small screen, the references can be displayed in the form of icons rather than text. As a further example, the module 3002 may detect the presence of GPS capability on the requesting device. When the requesting device is GPS-enabled, references to real-time communication with businesses can be provided based on the current location of the requesting device.

In one embodiment, the module 3002 detects capability attributes of the requesting device, such as available modes of communication. The references of real-time communication of a business can be displayed on the map based the capability attributes of the requesting device. For example, when the requesting device has telephone capability (e.g., VoIP enabled, having a modem connected to a phone line, or having an air interface for cellular communications), a telephone number and/or an icon (e.g., an icon of a telephone) can be displayed on the map in a selectable format, which when selected causes the initiation of the phone call to the telephone number. In one embodiment, whether an online chat ID is displayed on the map for communications with the business is based on whether the requesting device a chat ability (e.g., whether the requesting device has an instant messaging client software program).

Figure 31:
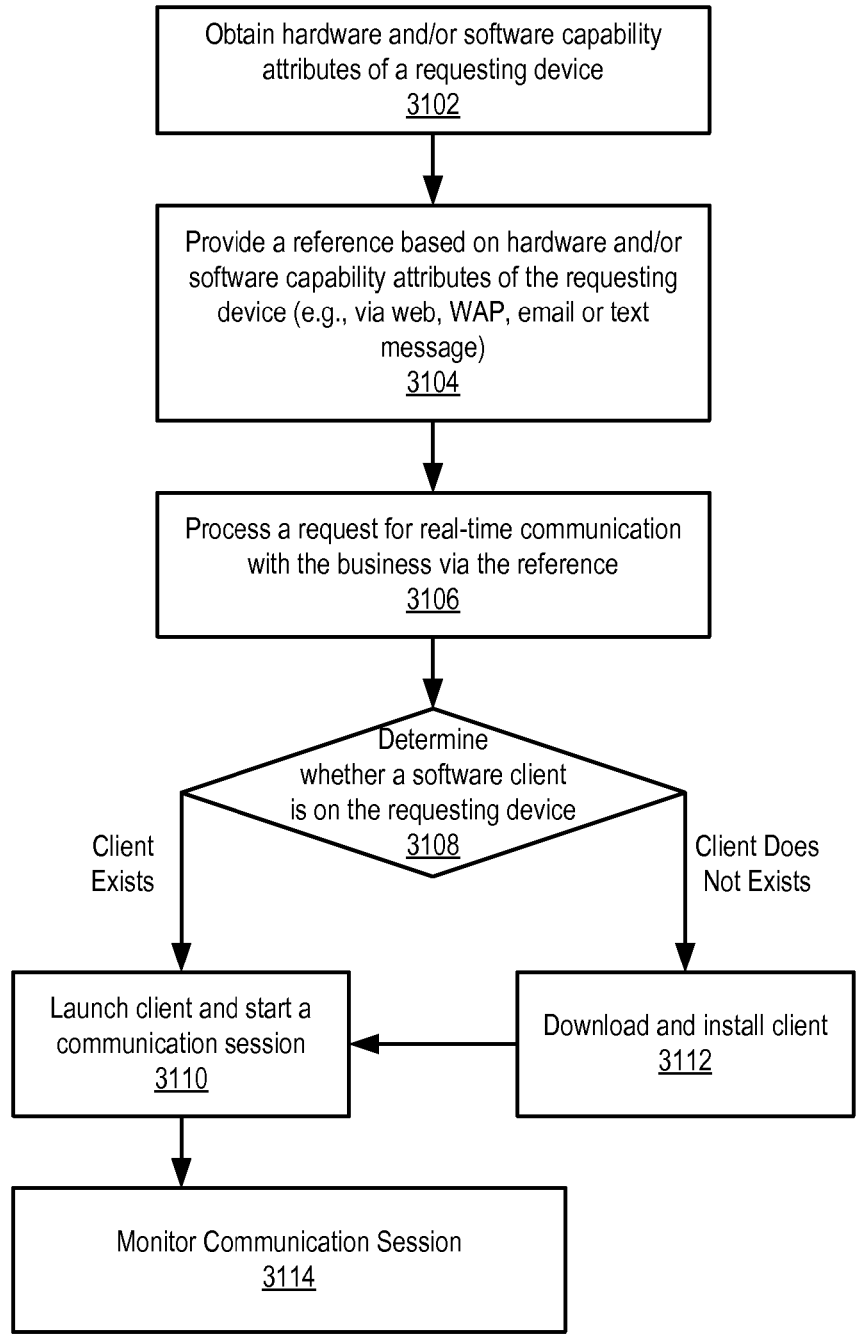
FIG. 31 is a flow chart illustrating a method to establish a communication session with the business, according to one embodiment.

FIG. 31 is a flow chart illustrating a method to establish a communication session with the business, according to one embodiment. In process 3102, hardware and/or software capability attributes of a requesting device is obtained. In process 3104, a reference is provided based on hardware and/or software capability attributes of the requesting device. For example, the reference may be provided via web, WAP, email, or text message). In process 3106, a request for real-time communication with the business via the reference is processed. Whether a software client is on the requesting device is determined in process 3108. If the client exists, the client is launched and a communication session is started in process 3110. If the client does not exist, the client is then downloaded and installed before launching the client and starting the communication session in process 3112. In process 3112, the communication session is monitored. In one embodiment, the reference provided is displayed on a map at a location corresponding to the location of the business in the map; and the reference is displayed as an advertisement, or as part of an advertisement, for the business. The communication session is monitored to bill the business for the advertisement for communication sessions connected to the business via the reference.

Figure 32:
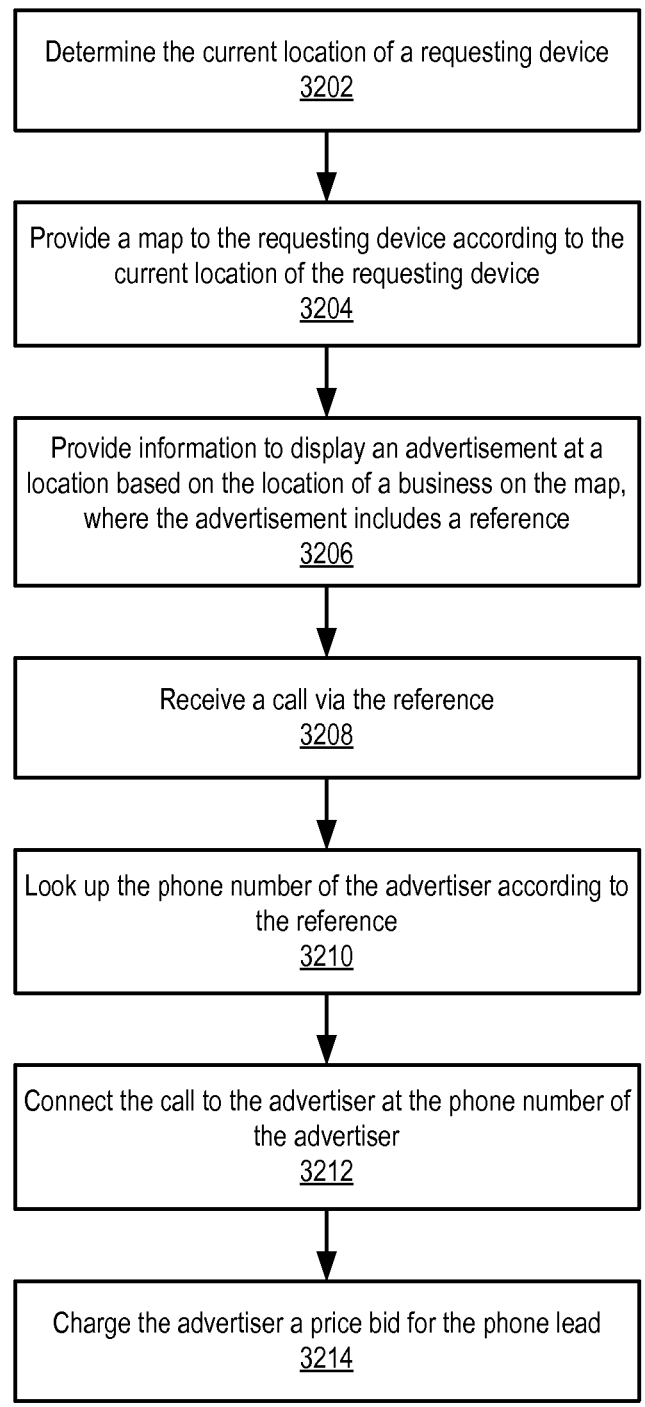
FIG. 32 is a flow chart illustrating a method to provide a location specific advertisement on a map, according to one embodiment.

FIG. 32 is a flow chart illustrating a method to provide a location specific advertisement on a map, according to one embodiment. In process 3202, the current location of a requesting device is determined. Then, in process 3204, a map is provided to the requesting device according to the current location of the requesting device. In process 3206, information to display an advertisement at a location in the map is provided based on the location of the business on the map, where the advertisement includes a reference. In process 3208, a call is received via the reference; in process 3210, the phone number of the advertiser is looked-up according to the reference. In process 3212, the call to the advertiser is connected at the phone number of the advertiser. In process 3214, a price bid for the phone lead is charged to the advertiser.

Figure 33:
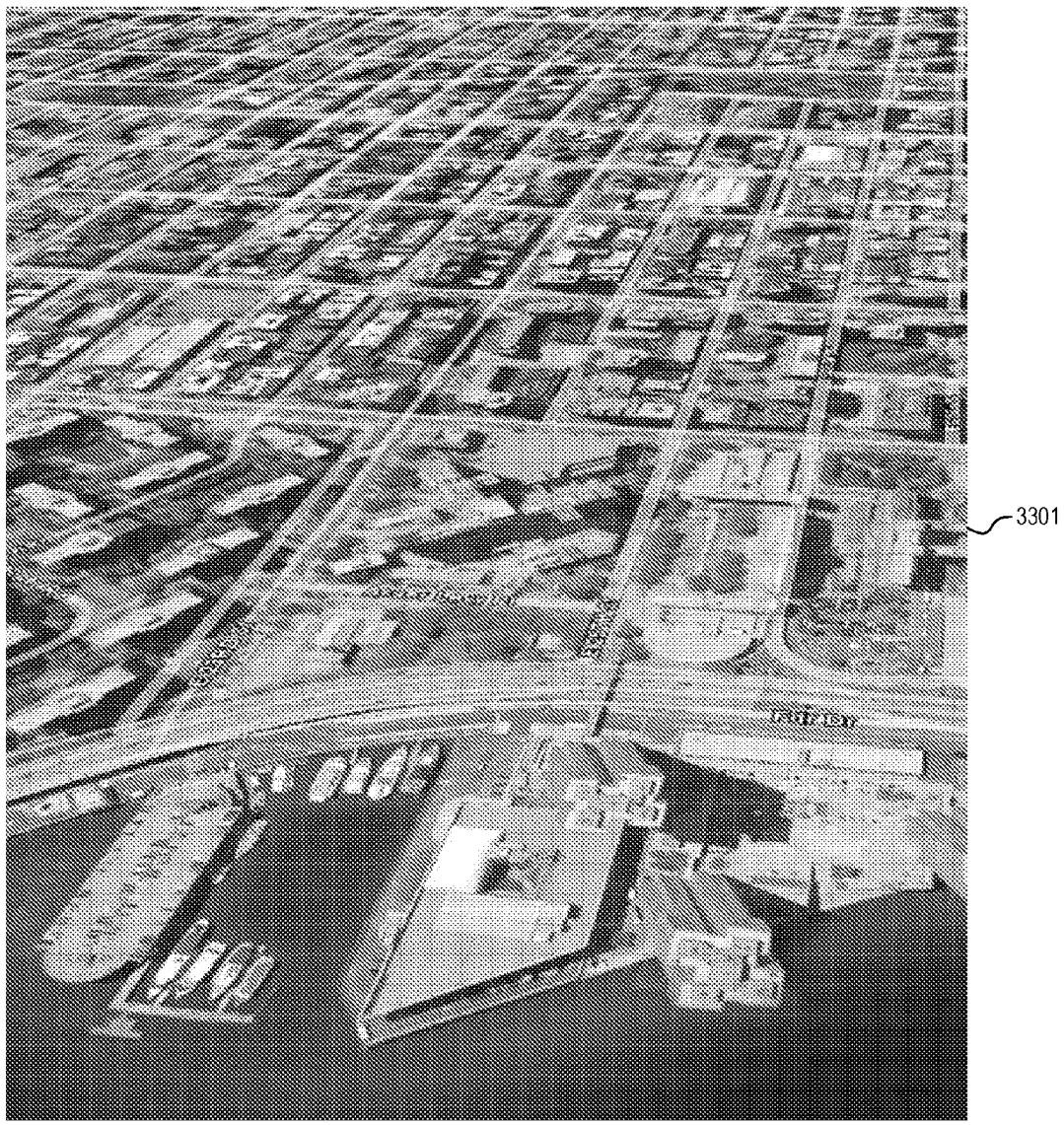
FIGS. 33-35 illustrate further examples of presenting advertisements according to embodiments of the disclosure.
Figure 34:
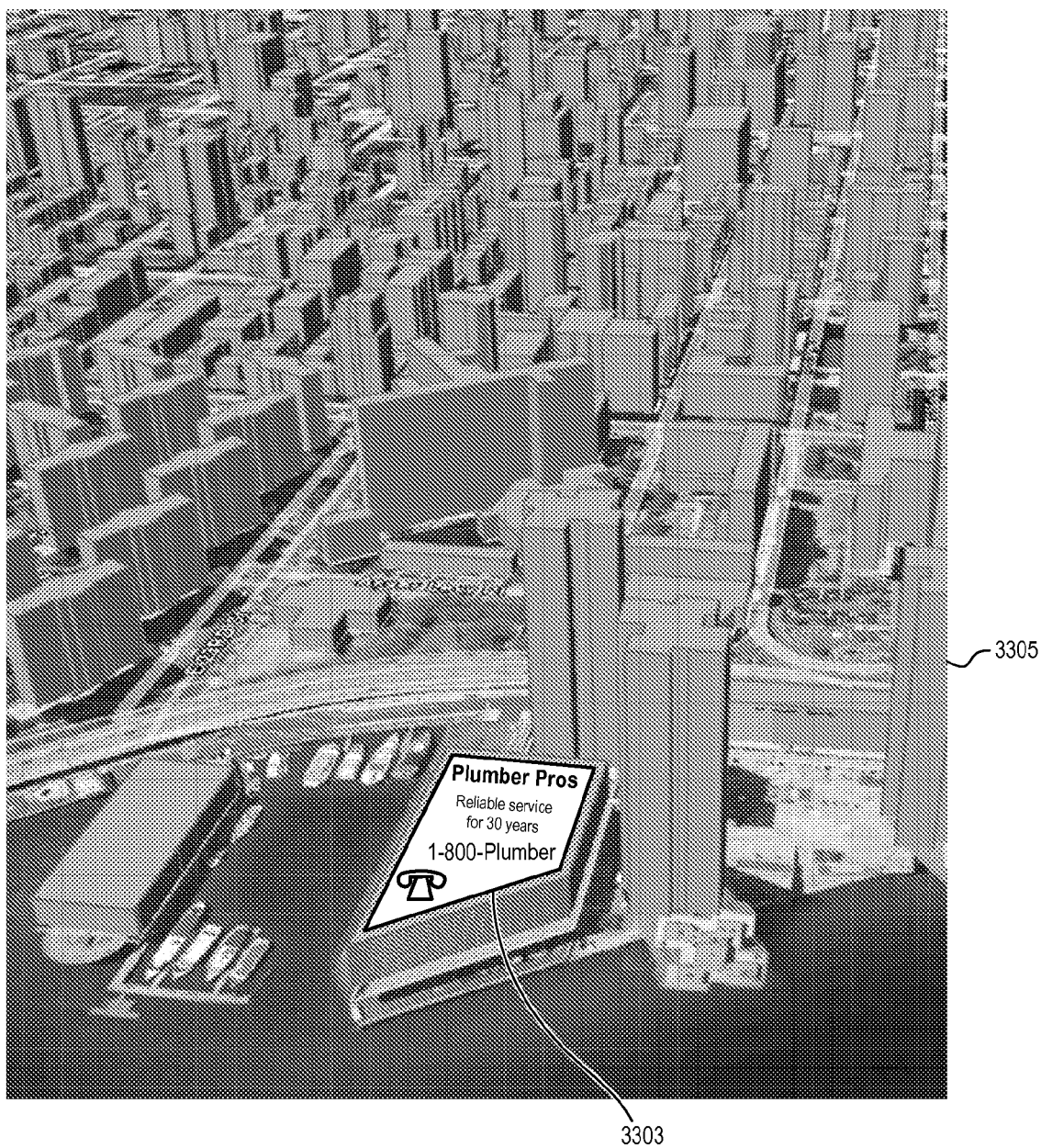
Figure 35:
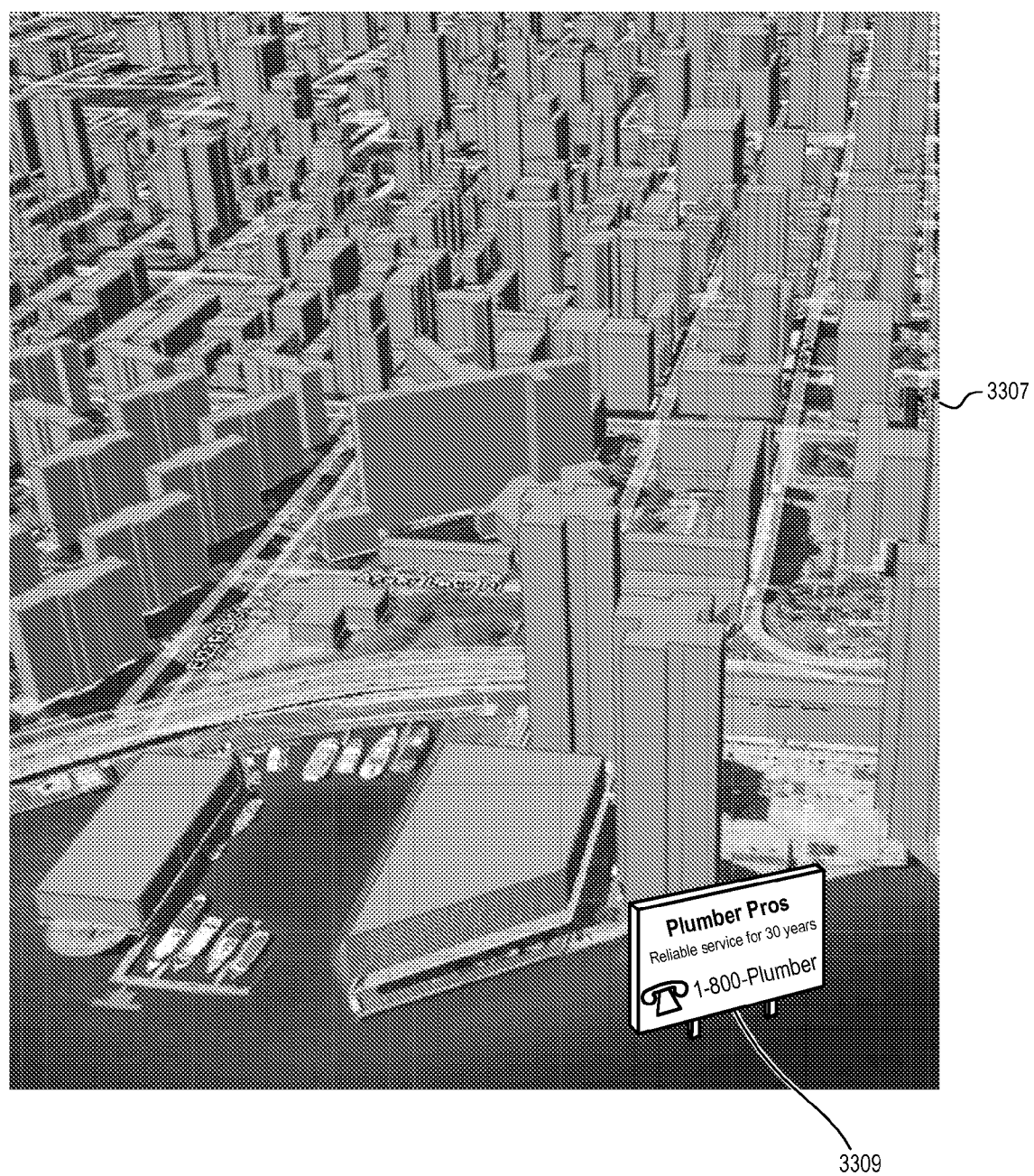

FIGS. 33-35 illustrate further examples of presenting advertisements according to embodiments of the disclosure.

FIG. 33 illustrates a 3D depiction (3301) of a portion of an earth. The depiction includes a photographic image of a region (e.g., a picture taken from a satellite, an airplane, or a tall building, etc.) and a street map superimposed on it. The 3D depiction may be generated by texture mapping a photographic image on a model of the earth, which is viewed from a viewpoint in the space.

In one embodiment, a pay-per-call advertisement can be presented on the rooftop of a building or in the field. The pay-per-call advertisement includes telephone number which is presented in a size that is sufficiently large to be seen when the depiction is displayed. The telephone number is assigned to the advertiser or advertisement, such that when the telephone number is called the advertiser's phone number can be determined based on the telephone number called; and the advertiser is charged an advertisement fee (e.g., based on a price bid of the advertiser) in response to a call connected via the telephone number presented in the advertisement.

In one embodiment, an advertisement is presented virtually on the rooftop of a building or in the field in the 3D depiction, as if the advertisement were presented on the rooftop or in the field and photographed. In one embodiment, a virtual representation of one or more real structures are overlaid on top of the photographic image; and the virtual representation include a surface which is used to presented an advertisement.

For example, FIG. 34 illustrates an example in which an advertisement is presented as a virtual rooftop (3303) of a 3D sketch of a building that is overlaid on the photographic image of the region. Since the virtual rooftop (3303) can be generated at the time the display is generated for presentation, the advertisement can be dynamically generated (e.g., according to the preference of the viewer, a search request received from the viewer, etc.). The virtual rooftop can also be presented with an advertisement in a 2D view (e.g., top view) of the geographic region.

In one embodiment, the advertisement presented as part of the virtual representation (e.g., 3D sketch of a building) is related to a geographic location of the advertiser. For example, the advertisement presented on a virtual rooftop of a building is for an advertiser that is located in sided the building, or near the building. The advertisement can also be presented on the side of the building. In one embodiment, the size of the surface (e.g., side or top) is compared to a threshold to determine whether to show the advertisement on the surface. When the size of the surface as displayed is sufficiently large, an advertisement is selected (e.g., based on the preference or search request of the viewer, the advertiser's location, etc.) for display. Alternatively, a selected advertisement can be continuously scaled, as if the advertisement were painted on the surface of the virtual representation (e.g., a rooftop or wall of a building or a field or stadium, etc.). In one embodiment, the content that is presented on the surface is dynamically selected based on a size of the surface. For example, when the zooming scale is increased, the surface as displayed has an increased size and more content can be presented for the advertisement.

In one embodiment, the advertisement presented as part of the virtual representation of a real structure in the representation of a geographic region contains interactive elements. For example, the advertisement can be selected to view a full size version of the advertisement (e.g., a landing page of the advertisement displayed on a popup window, on a separate layer, in a separate window/panel, etc.). For example, the advertisement may include an icon or link which can be selected to request for real time communication connection (e.g., a VoIP connection or an instant messaging connection) or to send a non-real time message, such as via an email or an SMS message. In one embodiment, when the advertisement is presented at a location that is different from the location of the advertiser, the location of the advertiser is shown or highlighted in response to the selection of the advertisement.

In one embodiment, the advertisement can be presented on a virtual structure which may not have a corresponding real structure on the earth. For example, the advertisement may be presented on a virtual billboard at a location on the map of the portion of the earth. In one embodiment, the virtual billboard is presented at a location that is typically allocated for the presentation of a billboard. In one embodiment, the virtual billboard is presented at a location that coincides with or near a real billboard. In one embodiment, the virtual billboard is presented at a location that would not be confused as a real object. In one embodiment, the virtual billboard is presented in a format that is distinct from virtual representation of real structures. In one embodiment, the virtual billboard is presented at a location close to the location of the advertiser. In one embodiment, the virtual billboard is overlaid on an area of a surface that corresponds to an advertisement in reality.

For example, FIG. 35 illustrates a virtual billboard (3309) presented in the 3D representation (3307) of a geographic region. The virtual billboard (3309) is presented in a format that is different from the 3D sketches of the buildings.

In one embodiment, a virtual reality, or an augmented reality is presented with advertisements. For example, in a virtual map of a city with virtual buildings, an advertisement can be placed on the side of a building. For example, an advertisement for Movie "Superman", or a couple of different advertisements, can be placed on the depiction of the Empire State Building. For example, a virtual billboard can be provided to show an advertisement for Coppertone suntan lotion on the virtual depiction of Waikiki beach in Oahu. Since there is limited space even in a virtual real estate world, advertisers may bid for the placement of their advertisements; and the highest bidders would get their advertisements placed at the locations that they bid on.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:
1. A method, comprising:
providing, by a server system to a customer's user device, indication of a map of a geographical region, the map comprising:

a first representation of a location of a business that corresponds to an actual geographical location of the business within the geographical region; and a second representation of a reference for real-time communication assigned to a group of businesses that share a common category, the second representation disposed in a vicinity of the first representation in relation to the map;

receiving, via the server system, from the customer's user device, an indication of a selection of the second representation of the reference for real-time communication assigned to the group of businesses;

in response to receiving the indication of the selection of the second representation of the reference for real-time communication assigned to the group of businesses, dynamically assigning, by the server system, a second reference for real-time communication with the business to the business;

providing, by the server system, the second reference for real-time communication to the customer's user device;

consequent to the providing the second reference, establishing a connection to facilitate real-time communication with the business, the connection based at least in part on voice over Internet protocol;

tracking usage of the second reference for real-time communication; and billing the business consequent to the providing the second reference for real-time communication based on quantitative usage of the second reference.

2. The method of claim 1, further comprising:
providing an instant messaging connection provided via the second reference to facilitate real-time communication with the business;
wherein the connection for real-time communication comprises a connection for communication in one or more of audio, voice, text, and/or video; and
wherein the quantitative usage of the second reference is based at least in part on the establishing the connection for real-time communication with the business via the second reference.

3. The method of claim 1, wherein the second reference includes at least one of a telephone number, a toll free telephone number, a local number, a vanity number, a number without an extension, a number with an extension, a click-to-call reference, a reference to request a connection via call-back, a click-to-reveal reference, a voice over Internet protocol identifier, an online chat identifier, a session initiation protocol address, and/or a universal resource identifier.

4. The method of claim 1, wherein:
the reference is selectable in a user interface to initiate real-time communication with the business; and
the reference includes at least one of a logo, tradename, trademark name, and/or a representation of a product of the business.

5. The method of claim 1, wherein the providing the second reference further comprises providing the second reference to the customer's user device based on hardware and software capability of the customer's user device.

6. The method of claim 5, further comprising:
determining whether the customer's user device is voice over Internet protocol enabled;
wherein the second reference includes a voice over Internet protocol identifier when the customer's user device is voice over Internet protocol enabled.

7. The method of claim 5, further comprising:
determining whether the customer's user device has a capability to place a telephone call;
wherein the reference is selectable to place a telephone call when the customer's user device has the capability to place a telephone call.

8. The method of claim 5 further comprising:
providing the second reference via one of emailing and text messaging to a portable device;
wherein the customer's user device comprises at least one of a voice over Internet protocol client, a wireless phone, a Bluetooth phone, a universal serial bus phone, a personal digital assistant, a handheld computing device, a computing device, a portable device, a telephone, and/or a global positioning system unit.

9. The method of claim 5, wherein the reference is based on a geographical location of the customer's user device.

10. The method of claim 5, further comprising:
generating an interactive document including the reference and the map of the geographical region based on a geographical location of the customer's user device.

11. The method of claim 1, wherein the map of the geographic region is a representation of at least a portion of earth's surface; and
wherein the representation includes any one or combination of a diagrammatic map, a street map, a virtual map, a satellite transmitted depiction, a photographic depiction, a video depiction, an audio description, a survey, an atlas, a contour map, a 2D representation of landmarks, a 3D representation of landmarks, a 2D representation of geographical features, a 3D representation of geographical features, a 2D representation of structures, and/or a 3D representation of structures.

12. The method of claim 1, wherein the second reference is provided via at least one of a broadcasting media, a television media, a radio media, a web interface, wireless application protocol, short message service, instant messaging, and/or a printed media.

13. A tangible, non-transitory computer-readable medium storing instructions that when executed by a computing device of a server system, cause the computing device to:
provide, to a customer's user device, information to cause indication of a map of a geographical region, the map comprising:
a first representation of a location of a business that corresponds to an actual geographical location of the business within the geographical region; and
a second representation of a reference for real-time communication assigned to a group of businesses that share a common category, the second representation disposed in a vicinity of the first representation in relation to the map;
receive, from the customer's user device, an indication of a selection of the representation of the reference for real-time communication assigned to the group of businesses;
in response to receiving the indication of the selection of the second representation of the reference for real-time communication assigned to the group of businesses, dynamically assign a second reference for real-time communication with the business to the business;
provide the second reference for real-time communication to the customer's user device;
consequent to the providing the second reference, establish a connection to facilitate real-time communication with the business, the connection based at least in part on voice over Internet protocol;
track usage of the second reference; and bill the business consequent to the providing the second reference for real-time communication based on quantitative usage of the second reference.

14. A system, comprising:
a server system comprising a connection server, a database server, at least one processor, and memory coupled to the at least one processor and storing instructions, that, when executed by the at least one processor, cause the server system to:
provide, to a customer's user device, indication of a map of a geographical region, the map comprising:
a first representation of a location of a business that corresponds to an actual geographical location of the business within the geographical region; and
a second representation of a reference for real-time communication assigned to a group of businesses that share a common category, the second representation disposed in a vicinity of the first representation in relation to the map;
receive, from the customer's user device, an indication of a selection of the second representation of the reference for real-time communication assigned to the group of businesses;
in response to receiving the indication of the selection of the second representation of the reference for real-time communication assigned to the group of businesses, dynamically assign a second reference for real-time communication with the business to the business;
provide the second reference for real-time communication to the customer's user device;
consequent to the providing the second reference, establishing a connection to facilitate real-time communication with the business, the connection based at least in part on voice over Internet protocol;
track usage of the second reference; and
bill the business consequent to the providing the second reference for real-time communication based on quantitative usage of the second reference.

* * * * *